United States Patent
Katsuragi et al.

(10) Patent No.: US 7,451,346 B2
(45) Date of Patent: Nov. 11, 2008

(54) STORAGE CONTROL DEVICE AND DATA RECOVERY METHOD FOR STORAGE CONTROL DEVICE

(75) Inventors: Eiju Katsuragi, Odawara (JP); Mikio Fukuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 11/403,841

(22) Filed: Apr. 14, 2006

(65) Prior Publication Data

US 2007/0220313 A1    Sep. 20, 2007

(30) Foreign Application Priority Data

Mar. 3, 2006    (JP) ............... 2006-057337

(51) Int. Cl.
*G06F 11/00*    (2006.01)

(52) U.S. Cl. .......................... 714/6; 711/114

(58) Field of Classification Search ............... None
See application file for complete search history.

(56) References Cited

U.S. PATENT DOCUMENTS

| | | | |
|---|---|---|---|
| 5,727,144 A * | 3/1998 | Brady et al. .................. 714/6 |
| 5,802,264 A * | 9/1998 | Chen et al. .................... 714/6 |
| 6,886,108 B2 * | 4/2005 | Talagala ......................... 714/5 |
| 7,058,762 B2 * | 6/2006 | Patterson et al. ............ 711/114 |
| 7,287,182 B2 * | 10/2007 | Tanaka et al. .................. 714/7 |
| 7,313,721 B2 * | 12/2007 | Ashmore ....................... 714/7 |
| 2005/0081087 A1 | 4/2005 | Yagisawa et al. |
| 2005/0262385 A1 * | 11/2005 | McNeill et al. ................ 714/5 |
| 2006/0117216 A1 * | 6/2006 | Ikeuchi et al. ................. 714/6 |
| 2007/0079170 A1 * | 4/2007 | Zimmer et al. ................ 714/6 |

* cited by examiner

*Primary Examiner*—Christopher S McCarthy
(74) *Attorney, Agent, or Firm*—Reed Smith LLP; Stanley P. Fisher, Esq.; Juan Carlos A. Marquez, Esq.

(57) ABSTRACT

The present invention efficiently recovers an error drive by suppressing futile copying. When the number of errors of the disk drive is equal to or more than a first threshold, data stored in the disk drive is copied to a spare drive by a drive copy section. When the number of errors of the disk drive is equal to or more than a second threshold prior to completion of the drive copy, the disk drive is closed, and a correction copy by a correction copy section is started in place of the drive copy. The correction copy section starts the correction copy from the position where the drive copy is interrupted by taking over the drive copy completion position (copy interrupt position) managed by a copy progress condition management section.

9 Claims, 27 Drawing Sheets

FIG. 27

ERROR MANAGEMENT TABLE (T12B)

| ACTUAL DRIVE NUMBER | DRIVE LEVEL | ERROR TYPE | ERROR COUNT VALUE |
|---|---|---|---|
| 0r | FC | MEDIA ERROR | EC01 |
| | | MECHANICAL ERROR | EC02 |
| | | INTERFACE ERROR | EC03 |
| 1r | FC | MEDIA ERROR | EC11 |
| | | MECHANICAL ERROR | EC12 |
| | | INTERFACE ERROR | EC13 |
| 2r | FC | MEDIA ERROR | EC21 |
| | | MECHANICAL ERROR | EC22 |
| | | INTERFACE ERROR | EC23 |
| ... | ... | ... | ... |

THRESHOLD MANAGEMENT TABLE (SCSI)
THRESHOLD MANAGEMENT TABLE (ATA)
THRESHOLD MANAGEMENT TABLE (FC) (T13B)

| ERROR TYPE | FIRST THRESHOLD Th1 (TO START DRIVE COPY) | SECOND THRESHOLD Th2 (TO START CORRECTION COPY) |
|---|---|---|
| MEDIA ERROR | Th1a | Th2a |
| MECHANICAL ERROR | Th1b | Th2b |
| INTERFACE ERROR | Th1a | Th2c |

US 7,451,346 B2

STORAGE CONTROL DEVICE AND DATA RECOVERY METHOD FOR STORAGE CONTROL DEVICE

CROSS-REFERENCE TO RELATED APPLICATIONS

This application relates to and claims priority from Japanese Patent Application No. 2006-57337 filed on Mar. 3, 2006, the entire disclosure of which is incorporated herein by reference.

BACKGROUND OF THE INVENTION

1. Field of the Invention

The present invention relates to a storage control device and a data recovery method for the storage control device.

2. Description of the Related Art

The storage control device generates RAID (Redundant Array of Independent Disks)-based redundant storage areas by using a plurality of disk drives such as hard disk drives, for example, and provides a host computer ('host' hereinbelow) with the storage areas. Even when a fault occurs in any of the disk drives in the storage areas made redundant through RAID, the storage capacity of the disk drive in which the fault occurred can be restored on the basis of the storage capacity stored in another disk drive.

In the prior art, when the number of errors occurring in a certain disk reaches a specified value of a first level, mirroring is started between the disk and spare disk. When the number of errors occurring in the disk reaches a specified value of a second level, mirroring is canceled and the operation is continued by using the spare disk (Japanese Patent Application No. 2005-100259).

In the prior art that appears in Japanese Patent Application No. 2005-100259, the reliability of the storage control device is raised by using the spare disk but the relationship between preventative copying to the spare disk and the restoration of data using a parity disk is not adequately considered and provides a margin for improvement.

For example, a case where data are not read due to the occurrence of a fault in the copy source disk before preventative copying to the spare disk is completed may be considered. In this case, data restoration work based on parity data is started. However, because the data restoration work is not synchronized with the preventative copying to the spare disk, data restoration work is performed with respect to all of the stored content of the disk in which the fault occurred irrespective of whether the preventative copying is complete.

Therefore, it takes a long time for the data restoration work to be completed and the response performance of the storage control device also drops. In particular, because of the advances in the increased capacity of disks in recent years, the time required for the data restoration work also readily grows. In addition, although there are differences depending also on the RAID level, when a fault occurs in another disk during the period until completion of the data restoration work, data can no longer be restored. In the case of RAID5, one disk fault can be tolerated and, with RAID6, up to two disk faults can be tolerated at the same time. In a RAID group in which data restoration work is being performed, the reliability drops during the period until the data restoration work is completed.

SUMMARY OF THE INVENTION

The present invention was conceived in view of the above problems and an object of the present invention is to provide a storage control device that is capable of efficiently recovering stored content that is stored on a storage disk in which an error has occurred as well as a data recovery method for the storage control device. A further object of the present invention is to provide a storage control device that is capable of performing data transfers without futility by synchronizing copy modes of a plurality of types as well as a data recovery method for the storage control device. Further objects of the present invention will become evident from the embodiments described subsequently.

In order to solve the above problem, the storage control device according to the present invention is a storage control device comprising a plurality of storage devices including at least one spare storage device, comprising: an error condition detection section that detects the error condition of each of the storage devices; an input/output request control section that, when an error is detected by the error condition detection section, controls the input/output request from a host computer with respect to the storage device in which the error has been detected; and a recovery control section that, when the error condition detected by the error condition detection section exceeds a preset threshold, recovers the stored content of a recovery-target storage device, in which the error has been detected, in the spare storage device, wherein the recovery control section comprises: a first copy mode that reads data from the recovery-target storage device and copies the data thus read to the spare storage device; and a second copy mode that restores data stored in the recovery-target storage device on the basis of data read from other storage devices belonging to the same RAID group as the recovery-target storage device and copies the restored data to the spare storage device, and wherein, when shifting from the first copy mode to the second copy mode, the recovery control section starts the second copy mode from a copy interrupt position of the first copy mode.

According to an aspect of the present invention, the recovery control section recovers the stored content of the recovery-target storage device by executing the first copy mode when the error condition detected by the error condition detection section is equal to or more than a first threshold and less than a second threshold; and recovers the stored content of the recovery-target storage device continuously by shifting from the first copy mode to the second copy mode when the error condition detected by the error condition detection section is equal to or more than the second threshold.

According to an aspect of the present invention, when shifting from the first copy mode to the second copy mode, the recovery control section secures the spare storage device used by the first copy mode and starts the second copy mode by using the secured spare storage device.

According to an aspect of the present invention, the recovery control section executes the first copy mode and the second copy mode serially as one process.

According to an aspect of the present invention, when the error condition detected by the error condition detection section is equal to or more than a first threshold and less than a second threshold, a first status for selecting the first copy mode is set for the recovery-target storage device, and, when the error condition detected by the error condition detection section is equal to or more than the second threshold, a second status for selecting the second copy mode is set for the recovery-target storage device. Further, the recovery control section copies data in predetermined amounts at a time from the recovery-target storage device to the spare storage device by starting the first copy mode when the first status has been set for the recovery-target storage device; updates copy position management information for managing the copy completion position each time a data copy of the predetermined amount is completed; confirms the status of the recovery-target storage device each time the copy position management information is updated; and shifts from the first copy mode to the second copy mode by using the copy position management information continuously when the status of the recovery-target storage device is changed from the first status to the second status.

According to an aspect of the present invention, the input/output request control section stores and manages, as update management information, the condition of the update to the spare storage device by the host computer; and the recovery control section executes the first copy mode or the second copy mode with respect to a storage area other than the updated storage area.

According to an aspect of the present invention, the input/output request control section specifies a storage device that is used to process input/output requests from the host computer on the basis of the update management information.

According to an aspect of the present invention, when a plurality of the second copy mode are started within the same RAID group, the recovery control section stores data that has been recovered by means of a second copy mode whose processing precedes other processing to a spare storage device of the preceding second copy mode and a spare storage device of a second copy mode whose processing is delayed respectively.

A data recovery method of a storage control device according to another aspect of the present invention is a method for recovering data stored in a storage control device comprising a RAID group constituted by a plurality of storage devices, comprising the steps of: detecting an error condition relating to each storage device in the RAID group; setting a first status for selecting a first copy mode for a recovery-target storage device in which an error has been detected when the detected error condition is equal to or more than a first threshold and less than a second threshold; setting a second status for selecting a second copy mode for the recovery-target storage device when the detected error condition is equal to or more than the second threshold; copying data in predetermined amounts at a time from the recovery-target storage device to the spare storage device by starting the first copy mode when the first status is set for the recovery-target storage device; updating copy position management information for managing a copy completion position each time a data copy of the predetermined amount is completed; confirming the status of the recovery-target storage device each time the copy position management information is updated; shifting from the first copy mode to the second copy mode by using the copy position management information continuously when the status of the recovery-target storage device is changed from the first status to the second status, and restoring data that has been stored in the recovery-target storage device on the basis of data that is read from the other storage devices belonging to the same RAID group as the recovery-target storage device; and copying the restored data to the spare storage device.

At least a portion of the respective means, parts, and steps of the present invention can sometimes be executed by a computer program. Further, the computer program can be distributed in a state where same is secured to various recording media or can be transmitted via a communication medium.

BRIEF DESCRIPTION OF THE DRAWINGS

FIG. 4 is an explanatory diagram that shows the constitution of a drive number management table, wherein FIG. 4A shows the state prior to conversion of a virtual drive number and FIG. 4B shows the state following conversion of a virtual drive number;

FIG. 8 is an explanatory diagram that schematically shows an aspect in which the drive status management table and drive number management table are switched together, wherein

FIG. 27 is an explanatory diagram showing yet another constitution of the error management table and threshold management table.

DESCRIPTION OF THE PREFERRED EMBODIMENTS

Figure 1:
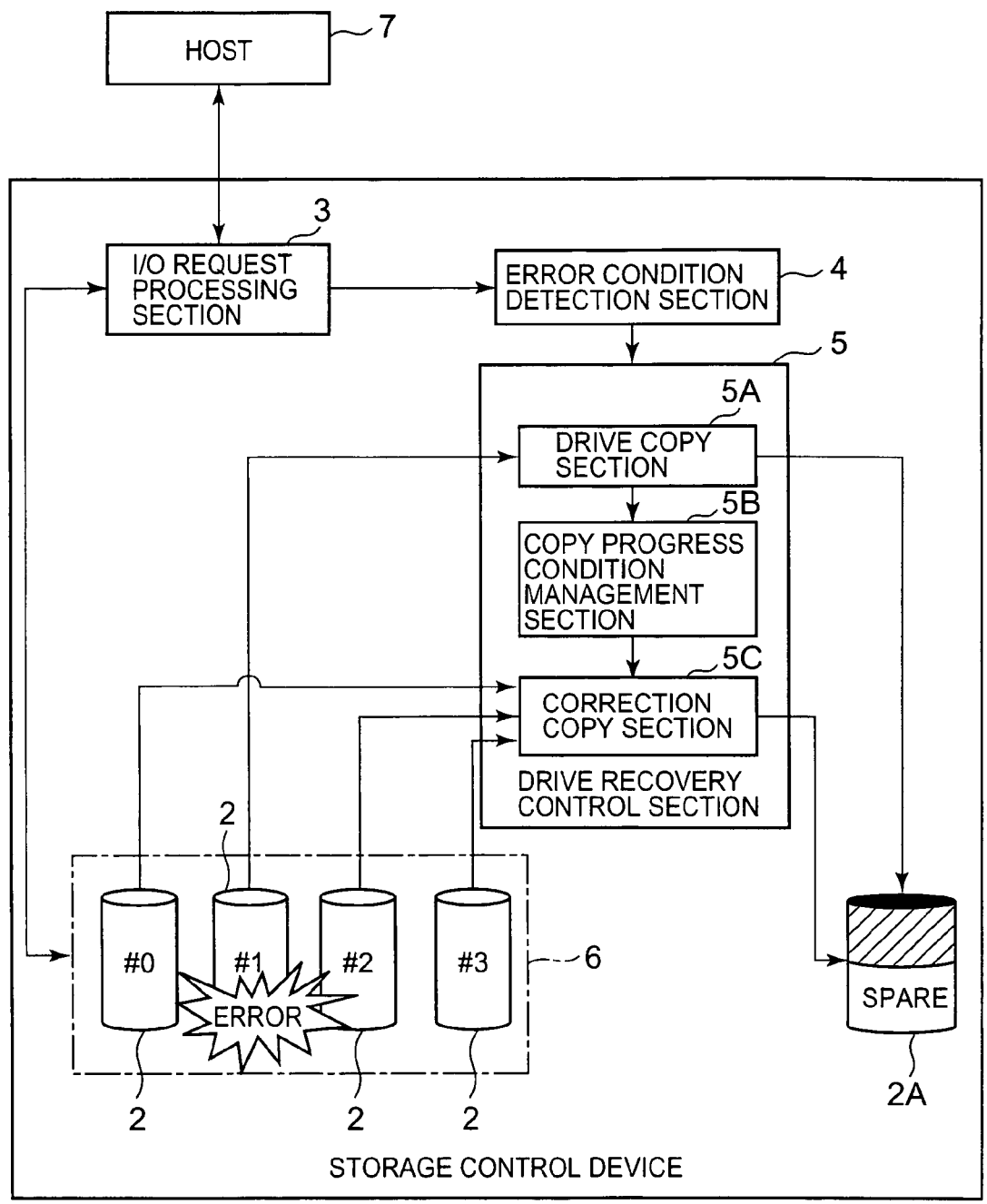
FIG. 1 is an explanatory diagram showing the overall concept of an embodiment of the present invention.

Embodiments of the present invention will be described hereinbelow with reference to the drawings. FIG. 1 is an explanatory diagram showing the overall concept of the present invention. A storage control device 1 of this embodiment provides a host 7, which is a 'host computer', with a large-capacity storage area.

The storage control device 1 comprises a disk drive 2 constituting a 'storage device' and a spare drive 2A. A RAID group 6 is formed by a plurality of the disk drives 2. In the example shown, an aspect in which a redundant storage area based on RAID5, for example, is constructed by a total of four disk drives 2 #0 to #3 is shown. The RAID group 6 is a physical storage area that has been made redundant and a logical storage area (logical volume) can be established in the physical storage area. The host 7 is able to identify the logical volume and issue read or write requests to the logical volume.

RAID will now be explained in simple terms. RAID0 is a system where data are divided and stored dispersed between a plurality of disks and is also known as striping. RAID0 simply disperses data and is incapable of recovering lost data. However, access is performed in parallel with the data dispersion. RAID0 does not secure redundancy at all.

RAID1 is a system for writing the same data to each of a plurality of disks and is also known as mirroring. In RAID1, the same data are held by different disks and, even when a fault occurs in one disk, data can be processed by using the other disk, whereby resistance to faults improves. However, because only half the total disk size can be used, there is an increase in costs.

RAID3 is system that divides data and writes the data so that same is dispersed between a plurality of data disks and parity that is generated from the divided data are stored in another parity disk.

RAID5 is a system that stores both data and parity so that same are dispersed between a plurality of disks. When data are updated, because data must be written back to the disk after reading the old data and old parity to calculate a new parity, the write-access performance is inferior to that of RAID1. However, in RAID5, because the data and parity are dispersed without using a parity-dedicated disk, write access can be executed at a relatively high speed. Further, the storage capacity of each disk can be efficiently used and the costs for securing redundancy are also low.

RAID6 generates two types of parity for one data item and stores the data and parity dispersed between the respective disks. In RAID6, the operation can be continued even when a fault occurs in two disks at the same time. Therefore, although the structure is complex, RAID6 is more fault-resistant than RAID5.

The I/O (input/output) request processing section 3 corresponds to an 'input/output request control section'. The I/O request processing section 3 processes read requests and write requests that are executed by the host 7. When a read request is executed by the host 7, the I/O request processing section 3 judges whether to store the required data in the cache memory and, when the required data are not stored in the cache memory, data are read from the disk drive 2. The I/O request processing section 3 transmits the data thus read to the host 7 after storing the data in cache memory. When a write request is issued by the host 7, the I/O request processing section 3 reports the end of processing to the host 7 after storing the write data in the cache memory and then writes the write data to the disk drive 2. In addition, as will be described subsequently, when data restoration work of the disk drive 2 is performed, the I/O request processing section 3 performs predetermined fault recovery processing. Fault recovery processing includes, for example, processing to recover data that has been requested by the host 7 by means of data and parity that are read from another disk drive 2 in which a fault has not occurred (correction read processing) and processing to save write data that is read from the host 7 in the cache memory, and so forth.

An error condition detection section 4 monitors the respective error conditions of each of the disk drives 2 on the basis of the response state of the respective disk drives 2. Error types can include, for example, media errors, mechanical errors, interface errors and so forth.

The drive recovery control section 5 corresponds to a 'recovery control section'. For a disk drive 2 in which an error of at least a predetermined value has been detected, the drive recovery control section 5 restores stored content that is stored in the disk drive 2 in the spare drive 2A.

The drive recovery control section 5 comprises a drive copy section 5A, a copy progress condition management section 5B, and a correction copy section 5C. The drive copy section 5A performs a drive copy of a 'first copy mode'. The drive recovery control section 5 is provided for the occurrence of faults when a drive copy is started when a prediction of a fault occurring in the disk drive 2 is detected. A drive copy is a preventative measure. Further, when a fault actually occurs in the disk drive 2, the drive recovery control section 5 starts a correction copy to restore data that should be stored in the disk drive 2 in which the fault occurred and copies the data to the spare drive 2A. By switching the managed numbers of the disk drive 2 in which the fault occurred and the spare drive 2A, the disk drive 2 in which the fault occurred is restored.

Drive copy is a mode for copying stored content of the disk drive 2 to the spare drive 2A. Drive copy can be considered to be divided into an initial copy stage and a duplication writing stage. The initial copy stage copies all the data stored in the copy-source disk drive 2 to the spare drive 2A. In the duplication writing stage, write data received from the host 7 is written to the copy-source disk drive 2 and the spare drive 2A. Hence, drive copy can also be called mirroring. Drive copy is executed when the number of errors produced in the disk drive 2 is at least a first threshold and less than a second threshold. Therefore, by suitably establishing a first threshold, drive copy is started before the disk drive 2 is unusable and the stored content of the disk drive 2 can be saved to the spare drive 2A.

The copy progress condition management section 5B manages the progress condition of the drive copy by means of a copy pointer that indicates the copy end position, for example. Information on the position in which copying is completed by means of the drive copy section 5A is handed over to the correction copy section 5C. The correction copy section 5C performs correction copy, which is a 'second copy mode'. Correction copy is a mode that restores data in the disk drive 2 in which a fault has occurred on the basis of data and parity stored dispersed between other disk drives 2 in which a fault has not occurred and copies the restored data to the spare drive 2A. Correction copy is executed when the number of errors of a disk drive 2 is reaches at least a second threshold.

For example, when the number of errors of the disk drive 2 (#1) is at least the first threshold, data that is stored in the disk drive 2 (#1) is copied to the spare drive 2A by the drive copy section 5A. When a fault occurs in the copy-source disk drive 2 (#1) after drive copy has ended normally, the operation can be continued by using the spare drive 2A.

On the other hand, when the number of errors of the disk drive 2 (#0) reaches at least the second threshold before drive copy is completed, the disk drive 2 (#1) is closed and correction copy using the correction copy section 5C starts in place of drive copy.

The correction copy section 5C starts correction copy from the position in which the drive copy was interrupted by handing over the drive copy end position (copy interrupt position) managed by the copy progress condition management section 5B. That is, the correction copy section 5C reads the data and parity from the other disk drives 2 (#0, #2, #3), restores the data in the disk drive 2 (#1) and then stores the restored data in the spare drive 2A.

Therefore, in this case, data that has been copied by means of the drive copy is stored in a first area from the header of the spare drive 2A to the drive copy interrupt position. Data that has been restored by the correction copy is stored in the second area from the drive copy interrupt position to the end of the spare drive 2A. There is no gap between the first and second areas, which are continuous.

Drive copy and correction copy share information (copy pointer and so forth) relating to the progress condition of drive copy and uses the same spare drive 2A. Here, in a job where drive copy is executed, drive copy and correction copy can be synchronized relatively simply by means of a configuration in which correction copy can also be executed.

When the stored content of the disk drive 2 (#1) is restored to the spare drive 2A, the spare drive 2A is used as disk drive (#1) in place of the disk drive 2 (#1) that was closed due to a fault. By varying the corresponding relationship between the information identifying the actual disk drive (actual drive number) and information identifying the respective drives constituting RAID group 6 (virtual drive number), the spare drive 2A can be used directly as the disk drive (#1).

There is no need to terminate access requests from the host 7 during the recovery period in which drive copy or correction copy is performed. When a read request or write request is issued by the host 7 during the recovery period, the I/O request processing section 3 performs predetermined processing. The details of the predetermined processing will be provided in a subsequent embodiment but will be described in simple terms first.

For example, in the above example, when a read request targeting disk drive 2 (#1) is issued by the host 7 during drive copy, the I/O request processing section 3 reads data from the disk drive 2 (#1) constituting the copy source and transmits the data to the host 7. When a write request is issued by the host 7 during drive copy, the I/O request processing section 3 writes write data to both the disk drive 2 (#1) and the spare drive 2A.

When a read request targeting the disk drive 2 (#1) is issued by the host 7 during correction copy, the I/O request processing section 3 judges whether the address of the requested data is located in the transferred storage area (recovered storage area). When the requested data has already been transferred to the spare drive 2A, the I/O request processing section 3 reads data from the spare drive 2A and transmits the data to the host 7. When the requested data has not yet been transferred to the spare drive 2A, the I/O request processing section 3 restores data on the basis of data and parity read from the other disk drives 2 (#0, #2, #3) and transmits the restored data to the host 7.

When a write request targeting the disk drive 2 (#1) is issued by the host 7 during correction copy, the I/O request processing section 3 reads the old data and old parity from the other disk drives 2 (#0, #2, #3). The I/O request processing section 3 generates a new parity on the basis of the old data and old parity and new write data and stores the new parity in the parity drive (drive for storing parity).

Further, when correction copy is executed, the copy-source disk drive 2 (#1) is closed and then a redundant drive. That is, the disk drive 2 (#1) is removed from the storage control device 1 following the completion of the correction copy. Further, another new spare drive is attached to the storage control device 1 by the maintenance worker.

This embodiment is constituted as mentioned earlier and, therefore, affords the following effects. This embodiment is constituted such that, when the transition is made from drive copy to correction copy, correction copy is started from the drive copy interrupt position. Therefore, drive copy and correction copy can be executed in harmony with one another, the drive recovery time is shortened, and user-friendliness and reliability can be raised.

That is, in this embodiment, useless copying to areas where drive copy is completed can be prevented and data that is stored to the disk drive 2 can be restored within a relatively short time. Because the recovery time can be reduced, the period in which redundancy is reduced can be shortened and a drop in reliability can be suppressed. Further, because the recovery time can be reduced, a drop in the responsiveness of the storage control device 1 can be suppressed, whereby user-friendliness also improves.

Moreover, because the configuration is such that correction copy is not executed with respect to ranges for which drive copy is complete, data that has been copied to the spare drive 2A can be effectively put to use and resistance to duplication faults of the disk drive can also be improved.

A case where a fault then occurs in another disk drive 2 (#0) during the period when correction copy for disk drive 2 (#0) is being performed may be considered. RAID5 is able to overcome any one drive fault. However, when a fault occurs in a plurality of disk drives at the same time, data cannot be restored. Therefore, in a normal case, when a fault occurs simultaneously in both disk drives 2 (#0, #1) (when a duplication fault occurs), data cannot be recovered and data disappears. However, in this embodiment, because data that has been copied to the spare drive 2A is copied by means of drive copy is overwritten by correction copy, data that has been copied to the spare drive 2A can be effectively used. Therefore, even when a drive duplication fault occurs, data can be recovered in the range in which data that has been copied to the spare drive 2Acan be used and the chance of the data disappearing can be reduced. This embodiment will be described in detail hereinbelow.

First Embodiment

Figure 2:
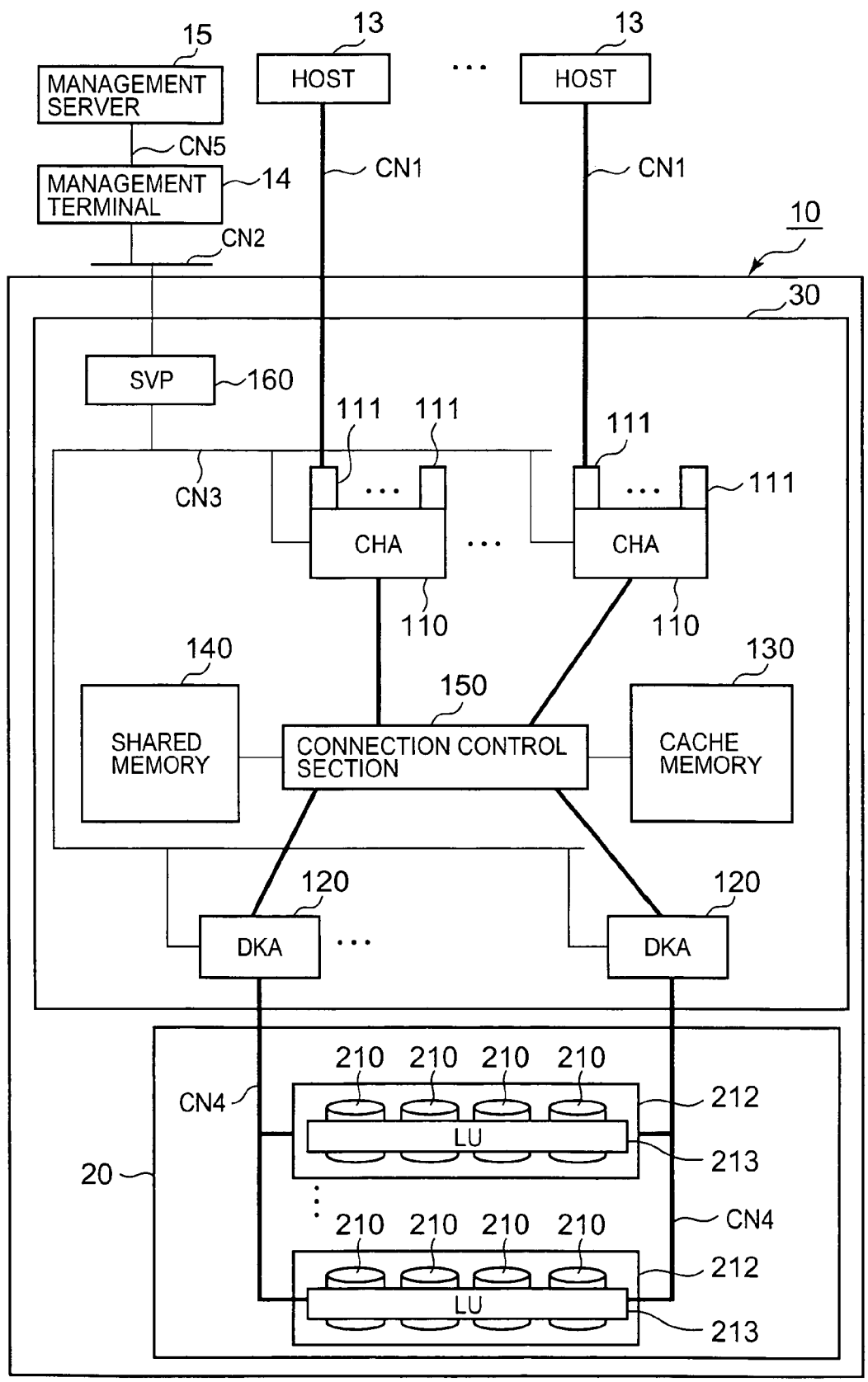
FIG. 2 is an explanatory diagram showing the constitution of the storage control device.

FIG. 2 is an explanatory diagram showing the overall constitution of the storage system including the storage control device 10 of this embodiment. The storage system can be constituted comprising the storage control device 10, a host 13, a management terminal 14, and a management server 15, for example. To explain the relationship with FIG. 1, the storage control device 10 corresponds to the storage control device 1 in FIG. 1, the host 13 corresponds to the host 7 in FIG. 1, the disk drive 210 corresponds to the disk drive 2 in FIG. 1, and the RAID group 212 corresponds to the RAID group 6 in FIG. 1.

First, the peripheral constitution of the storage control device 10 will be described, followed by the constitution of the storage control device 10. The host 13 is constituted as a computer device such as a personal computer, a server computer, a mainframe, an engineering workstation or the like, for example. The host 13 is connected to the storage control device 10 via the communication network CN1 such as a LAN (Local Area Network), SAN (Storage Area Network), or the like, for example. When the host 13 is a so-called open-system server, the host 13 and storage control device 10 perform data communications in accordance with a protocol such as TCP/IP (Transmission Control Protocol/Internet Protocol), FCP (Fibre Channel Protocol) or the like, for example. When the host 13 is a main frame machine, the host 13 and storage control device 10 perform data communications in accordance with a protocol such as FICON (Fibre Connection®), ESCON (Enterprise System Connection®), ACONARC (Advanced Connection Architecture®), FIBARC (Fibre Connection Architecture®), for example.

The management terminal 14 manages the constitution and so forth of the storage control device 10. The management terminal 14 is connected to a service processor ('SVP' hereinbelow) 160 in the storage control device 10 via a communication network CN2 such as a LAN, for example. Further, the management terminal 14 can also be connected to a management server 15 via another communication network CN5 such as the Internet, for example. The management server 15 is connected to a vendor such as the storage control device 10, for example, so as to be capable of managing a plurality of management terminals 14.

The constitution of the storage control device 10 will be described next. The storage control device 10 can be broadly classified as a storage section 20 and a controller 30. The storage section 20 is constituted by arranging a plurality of disk drives 210 in the form of an array, for example.

Various storage devices such as a hard disk drive, a semiconductor memory drive, an optical disk drive, a magneto-optical disk drive, and a magnetic tape drive, for example, can be used as the disk drive 210. Further, when a hard disk drive is used, a variety of types of hard disk drives can be used such as an FC (Fibre Channel) disk drive, a SATA (Serial AT Attachment) disk drive, and a SCSI (Small Computer System Interface) disk drive, for example. Furthermore, a variety of different types of storage devices can also be mixed in the storage section 20.

The RAID group 212 is constituted by a predetermined number of disk drives 210 although the number varies depending on the RAID level and so forth. For example, a RAID5 configuration can be obtained from three data disks and one parity disk, for example (3D+1P). Alternatively, a RAID6 configuration can also be obtained from four data disks and two parity disks (4D+2P), for example. In addition, a RAID1 configuration can also be obtained from one primary disk and one secondary disk.

The RAID group 212 is a redundant physical storage area and is also called a physical storage device. One or a plurality of logical storage areas 213 can be established on the physical storage area provided by the RAID group 212. The logical storage area 213 is called a logical volume (displayed as 'LU' in FIG. 2), for example. The logical volume 213 is the access target of the host 13. When a communication path is established between the host 13 and the logical volume 213, the host 13 is able to write data to the logical volume 213 and read data from the logical volume 213.

The controller 30 controls the operation of the storage control device 10. The controller 30 can be constituted comprising a channel adapter ('CHA' hereinbelow) 110, a disk adapter ('DKA' hereinbelow) 120, a cache memory 130, a shared memory 140, a connection control section 150, and an SVP 160, for example.

Each CHA 110 controls the data transfer to and from each host 13 and comprises a plurality of communication ports 111. A plurality of CHA 110 can be provided in the storage control device 10. The CHAs 110 are prepared in accordance with the type of host 13 and may be an open-system server CHA, mainframe CHA, or the like, for example. Each CHA 110 receives commands requesting the reading and writing of data from the host 13 that is connected to each CHA 110 and operates in accordance with the commands received from the host 13.

A plurality of each DKA 120 can be provided in the storage control device 10. The respective DKA 120 control data communications to and from the respective disk drives 210. Each of the DKA 120 and each of the disk drives 210 are connected via a SAN or other communication network CN4, for example, and perform data transfers in block units in accordance with the Fibre Channel protocol. Each of the DKA 120 monitors the states of the disk drives 210 and the monitoring results are transmitted to the SVP 160 via an internal network CN3. The respective CHA 110 and DKA 120 can also be constituted as separate control circuit substrates and a CHA function and DKA function can also be provided on one control circuit substrate.

The cache memory 130 stores user data and so forth, for example. The cache memory 130 can be constituted by a nonvolatile memory, for example, but can also be constituted by a volatile memory. When the cache memory 130 is constituted by a volatile memory, the cache memory 130 is backed up by a battery.

The shared memory (or control memory) 140 stores various control information for controlling the operation of the storage control device 10, and management information, and so forth. The shared memory 140 is constituted by a nonvolatile memory, for example. The control information and so forth can be multiplexed and managed by a plurality of shared memories 140.

Further, the cache memory 130 and shared memory 140 may be constituted as separate memory circuit substrates or the cache memory 130 and shared memory 140 may be mounted within one memory circuit substrate. Further, the constitution may be such that a portion of the cache memory is used as a control area for holding control information and the remaining portion of the cache memory is used as a cache area for storing data.

The connection control section 150 connects each CHA 110, each DKA 120, the cache memory 130 and the shared memory 140. As a result, all the CHA 110 and DKA 120 are capable of accessing the cache memory 130 and shared memory 140 by means of the connection control section 150. The connection control section 150 is constituted as a crossbar switch or the like, for example.

The SVP 160 is connected to each CHA 110 and each DKA 120 via an internal network CN3 such as a LAN. Alternatively, the SVP 160 can also be connected only to each CHA 110 via the communication network CN3. The SVP 160 is connected to a management terminal 14 via the communication network CN2 and collects the various states in the storage control device 10 before supplying these states to the management terminal 14. Further, the management terminal 14 or management server 15 are also capable of changing the constitution and so forth of the storage control device 10 via the SVP 160.

As mentioned earlier, the controller 30 can be constituted by mounting substrates (CHA 110, DKA 120, and so forth) of a plurality of types in a controller enclosure but is not limited to such a constitution. A constitution in which each of the abovementioned functions (the communication function for communication with the host 13, the communication function for communication with the disk drive 210, and the data processing function and so forth) are mounted on a single control substrate is also acceptable. In this case, the constitution is a redundant constitution in which a plurality of control substrates are provided, which is preferable from the perspective of improving the reliability of the storage control device 10.

Figure 3:
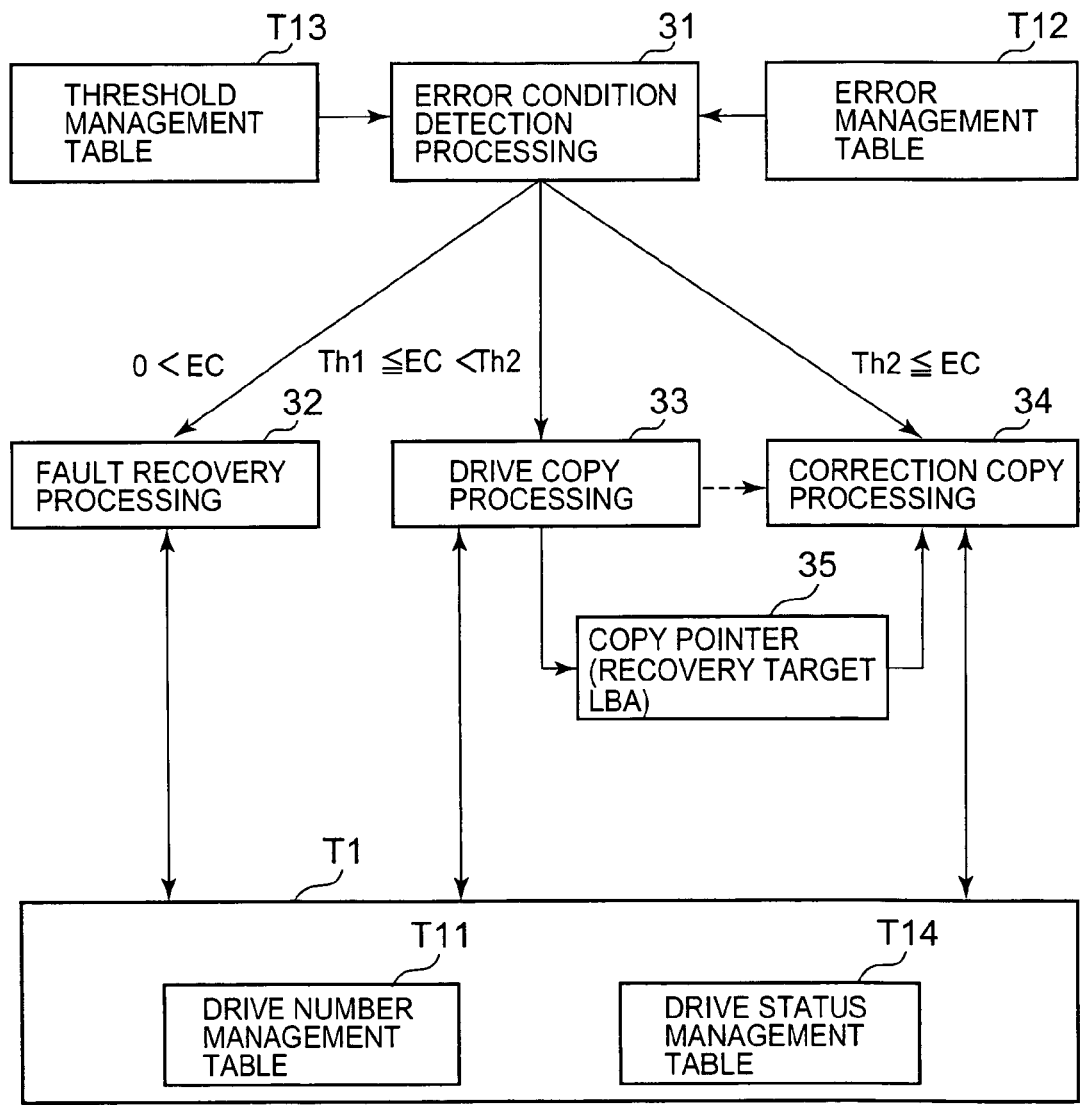
FIG. 3 is an explanatory diagram that schematically shows the relationship between the respective processes and tables.

FIG. 3 is an explanatory diagram that schematically shows a portion of the constitution of the program of the controller 30. The controller 30 implements error condition detection processing 31, fault recovery processing 32, drive copy processing 33, and correction copy processing 34. Each of these processes 31 to 34 is constituted as a computer program, for example. Although the details of each process will be described subsequently, the error condition detection processing 31 is processing for monitoring the condition of errors produced in each disk drive 210 on the basis of the response of each disk drive 210.

The fault recovery processing 32 processes access requests from the host 13 in a period in which the recovery of data is performed with respect to a disk drive in which an error has been detected (also called an 'error drive', 'faulty drive' or 'recovery-source drive' hereinbelow) 210.

The drive copy processing 33 controls data copying from the error drive to the spare drive. The correction copy processing 34 restores data stored on the error drive and copies the restored data to the spare drive on the basis of data and parity stored on other disk drives 210 belonging to the same RAID group 212 as the error drive.

Each of the above processes 31 to 34 implements the respective functions by using a plurality of tables T11 to T14. The respective tables T11 to T14 are stored in the shared memory 140. The details of the respective tables T11 to T14 will be described subsequently in conjunction with other drawings but will be described in simple terms first.

The error management table T12 is a table that performs management for each of the disk drives 210 by classifying the numbers of errors produced in each of the disk drives 210 into each error type. The threshold management table T13 is a table for managing a first threshold Th1 and a second threshold Th2 that are set beforehand for each error type.

The error condition detection processing 31 monitors to what extent each type of error occurs in each of the disk drives 210 by using the tables T12 and T13. The fault recovery processing 32, drive copy processing 33, and correction copy processing 34 are started up on the basis of the error condition detected by the error condition detection processing 31. For example, when an error is detected in a certain disk drive 210, fault recovery processing 32 is performed for this error drive 210.

When the number of errors is equal to or more than the first threshold Th1 and less than the second threshold Th2, the drive copy processing 33 is started for the error drive 210. In addition, when the number of errors is equal to or more than the second threshold Th2, correction copy processing 34 is performed for the error drive 210. Here, when the transition is made from the drive copy processing 33 to the correction copy processing 34, a copy pointer 35, which indicates the position in which copying was completed by the drive copy processing 33, is taken over by the correction copy processing 34. The copy pointer 35 indicates the position to be copied next, that is, address information on the storage destination for holding data that is to be recovered next is shown in the format of a logical block address (LBA).

The drive number management table T11 is for managing the corresponding relationship between the actual drive number that each of the disk drives 210 has and the virtual drive number. The drive status management table T14 manages the status of each disk drive 210. The drive status can also be called the drive access level, for example.

The details will be provided subsequently, but the controller 30 can be used by switching a plurality of table sets T1 and T2 (See FIG. 8). Each of the table sets T1 and T2 contains the drive number management table T11 and the drive status management table T14. When the transition is made from the drive copy processing 33 to the correction copy processing 34, the controller 30 rewrites the content of each of the tables T11 and T14 in the expected table sets beforehand in order to maintain the identity of the disk drive constituting the data recovery destination (the spare drive). Further, upon completion of the rewriting, the controller 30 continues the control by switching to the rewritten table sets.

Figure 4:
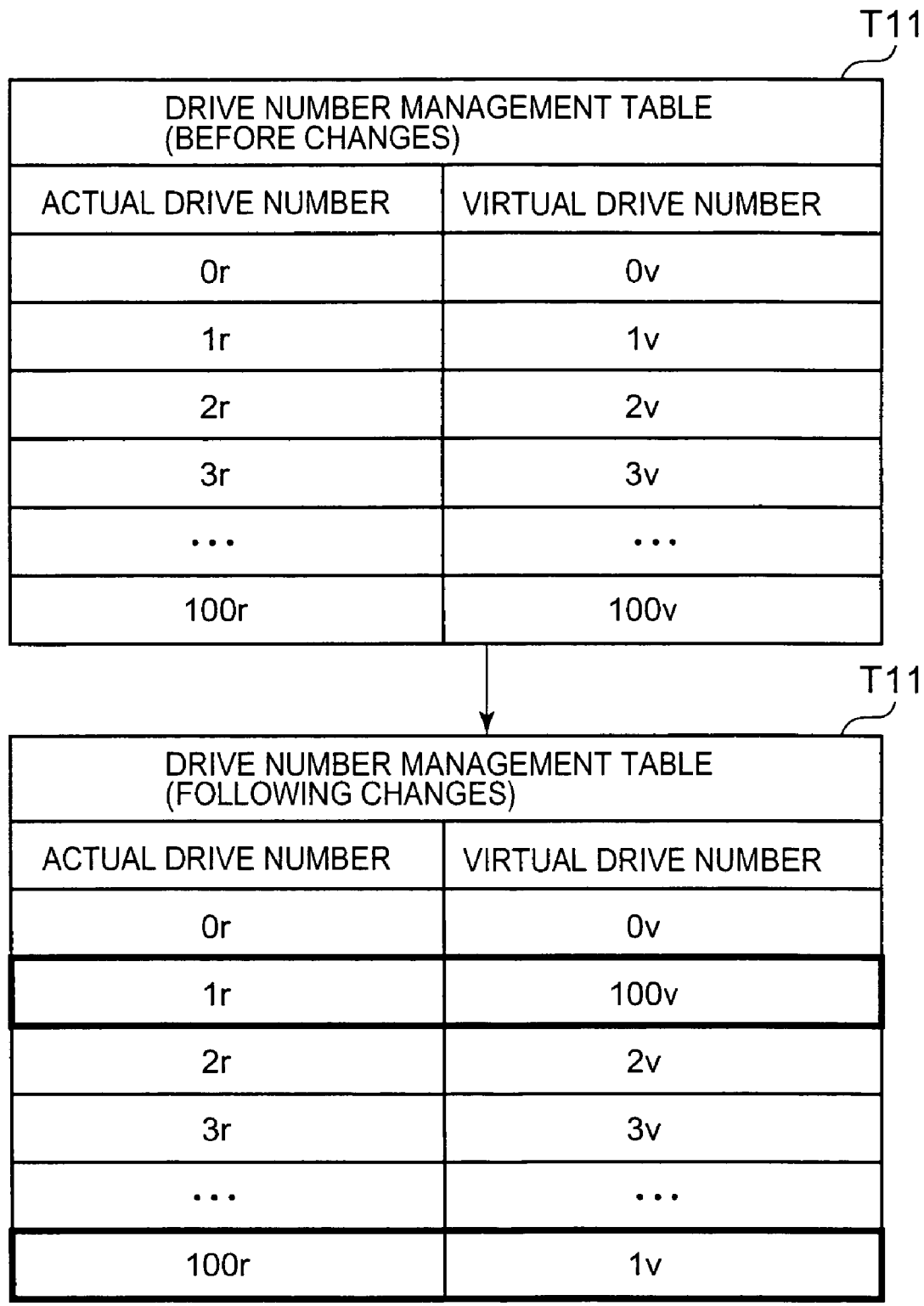

FIG. 4 is an explanatory diagram showing an example of the drive number management table T11. As mentioned earlier, the drive number management table T11 manages the association between the actual drive number and the virtual drive number.

The actual drive number is identification information for uniquely specifying each of the current disk drives 210. In FIG. 4, actual drives are represented by appending "r" to the numeral for the sake of expediency in the description. The virtual drive number is virtual identification information established so that the number of each of the disk drives 210 constituting the RAID group 212 has a continuous value. In FIG. 4, virtual drives are represented by appending "v" to the numeral.

Thus, by performing management through division into actual drive numbers and virtual drive numbers, the constitution of the RAID group 212 can be changed flexibly without changing the actual positions of the disk drives 210.

An aspect before changing the corresponding relationships of the drive numbers is shown at the top of FIG. 4. In a state before recovery of an error drive is performed, that is, in a state where each disk drive 210 is running normally, the virtual drive number "100v" is allocated to the spare drive (100r).

An aspect after changing the corresponding relationships of the drive numbers is shown at the bottom of FIG. 4. When recovery of the error drive (1r) is started, a virtual drive number "1v" is allocated to the spare drive (100r) and a virtual drive number "100v" is allocated to the error drive (1r). As a result, the spare drive (100r) references the RAID group 212 without moving the actual position.

Figure 5A:
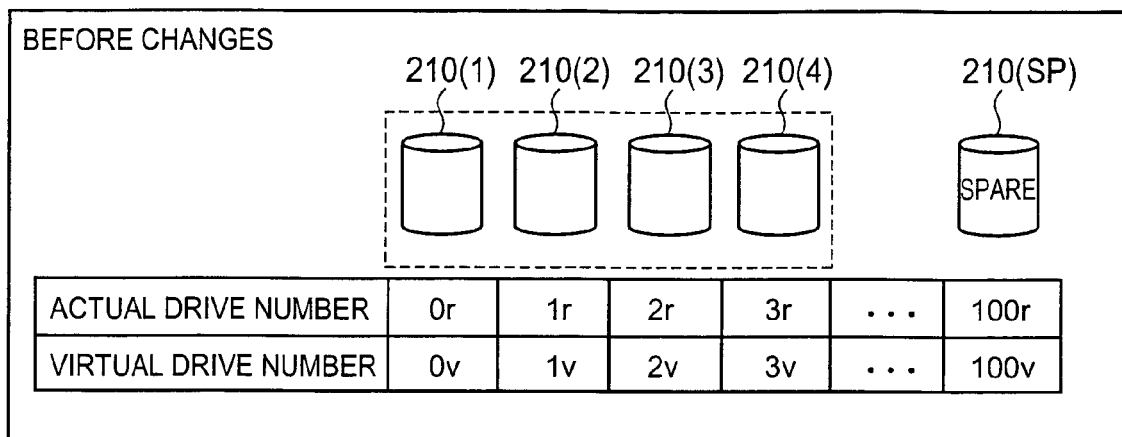
FIG. 5 is an explanatory diagram showing an aspect in which a spare drive is integrated into a RAID group by converting the virtual drive number.
Figure 5B:
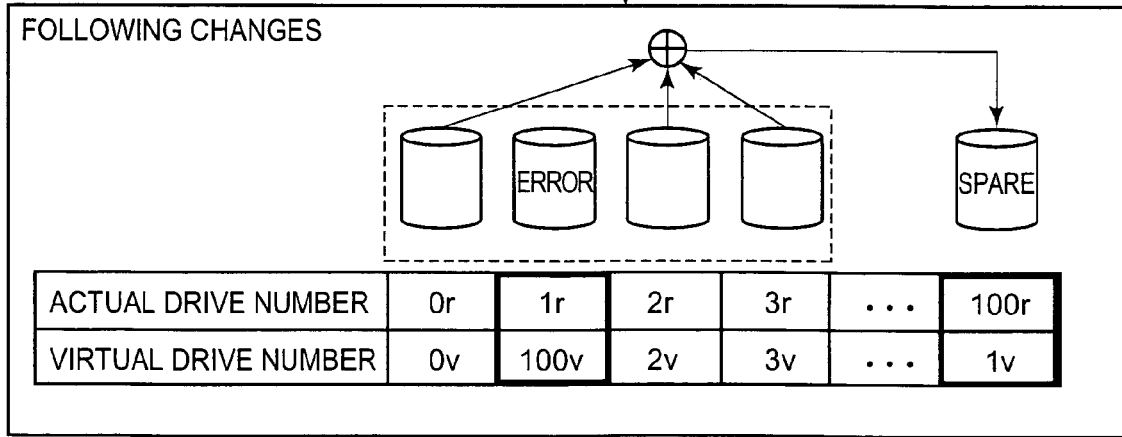

FIG. 5 is an explanatory diagram schematically showing the above aspect. FIG. 5A shows a normal case and FIG. 5B shows a case where an error drive is recovered. In a normal case, consecutive virtual drive numbers "0v" to "3v" are allocated to each of the disk drives 210 (1) to 210 (4). The virtual drive number "100v" is allocated to the spare drive 210 (SP).

As shown in FIG. 5B, an error equal to or more than the second threshold Th2 occurs in the disk drive 210 (2) and the disk drive 210 (2) is closed. The data stored in the error drive 210 (2) can be logically restored on the basis of the data and parity that are stored dispersed between the other disk drives 210 (1), 210 (3), and 210 (4).

Here, by making the virtual drive number of the spare drive 210 (SP) "1v" and the virtual drive number of the error drive 210 (2) "100v", the spare drive 210 (SP) in which data has been restored can be integrated into the RAID group 212 in place of the error drive 210 (2).

Figure 6:
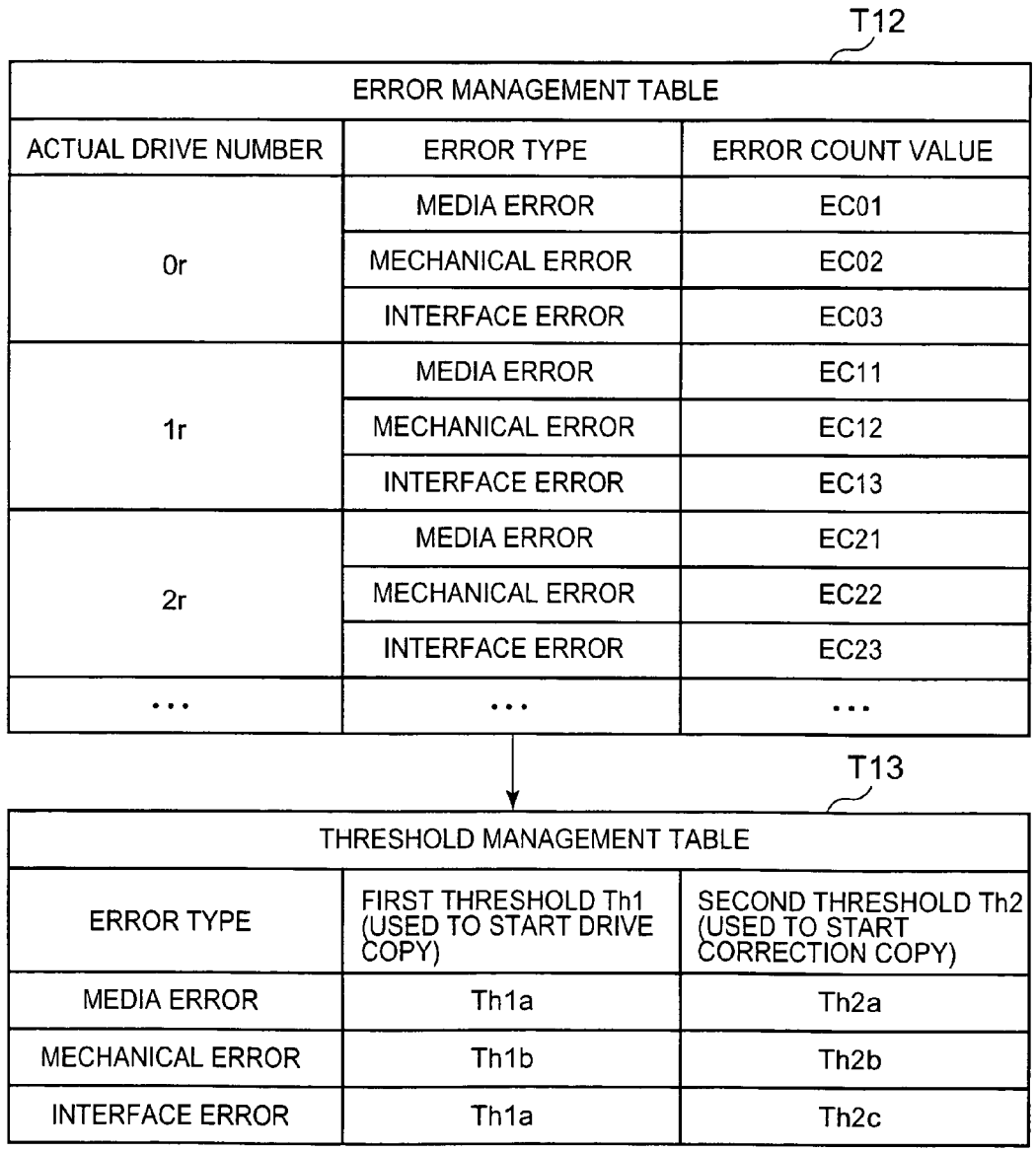
FIG. 6 is an explanatory diagram showing the constitution of an error management table and a threshold management table.

FIG. 6 is an explanatory diagram showing an example of an error management table T12 and a threshold management table T13. The error management table T12 shown at the top of FIG. 6 is constituted by associating actual drive numbers, error types, and error count values, for example. That is, the error management table T12 totals the number of errors produced in each of the disk drives 210 for each actual drive number and classifies the numbers of errors by the error type.

The threshold management table T13 shown at the bottom of FIG. 6 performs management by associating the first threshold Th1 and second threshold Th2 for each error type. Each threshold Th1 and Th2 can be changed via the SVP 160 from the management terminal 14 and management server 15, and so forth, for example.

Error types can include media errors, mechanical errors, interface errors, and so forth, for example. Media errors signify error related to hard disks. Mechanical errors signify errors relating to the mechanisms in the disk drives 210. Interface errors signify errors related to the interface between the disk drives 210 and the DKA 120. The first threshold Th1 and second threshold Th2 can be established for each error type.

The first threshold Th1 is a threshold for starting drive copy. The second threshold Th2 is a threshold for starting correction copy. In the case of either error type, when an error count value EC is equal to or more than the first threshold Th1, drive copy is started. When the error count value EC rises further and reaches the second threshold Th2, correction copy is successively executed in place of drive copy.

Figure 7:
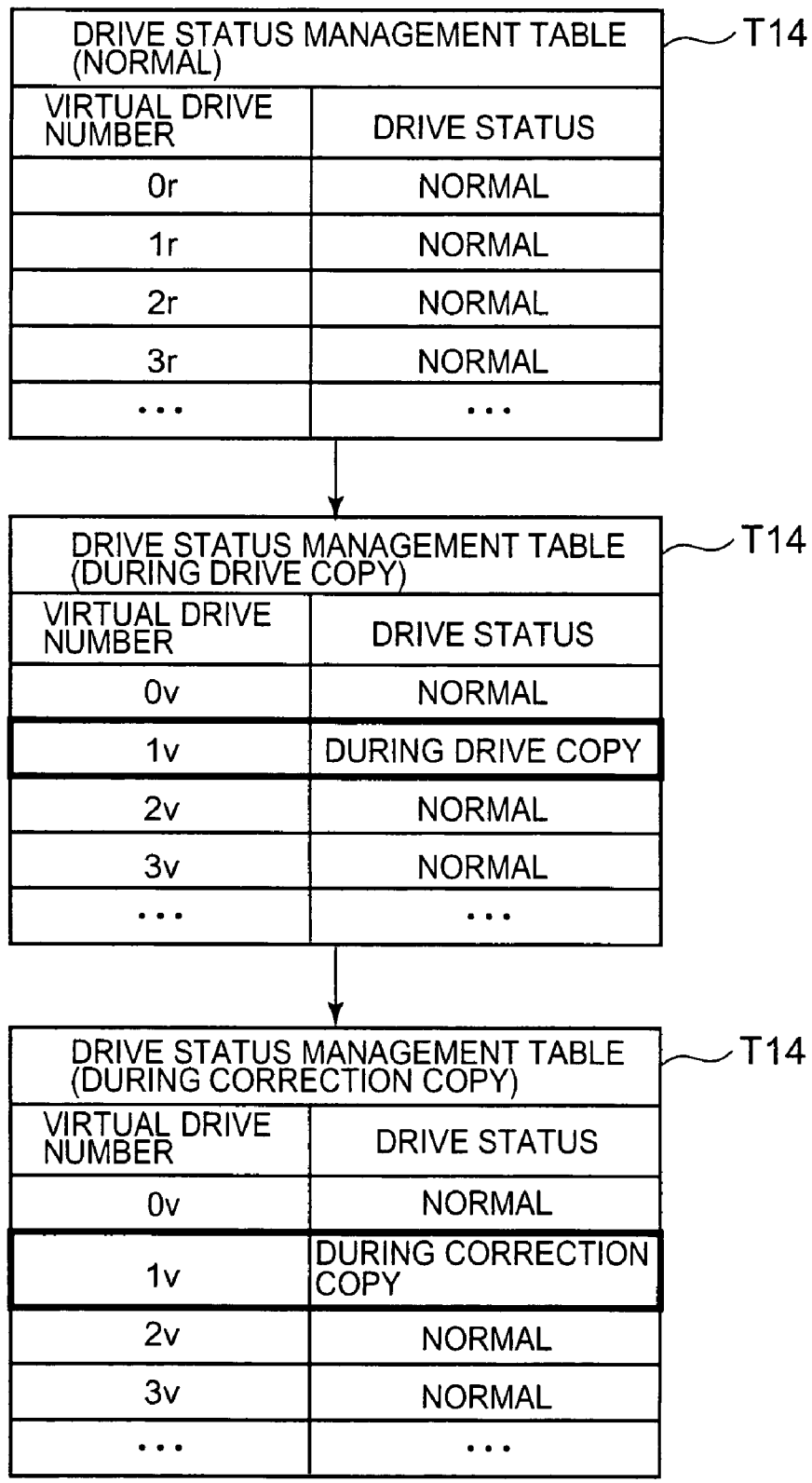
FIG. 7 is an explanatory diagram showing the constitution of a drive status management table.

FIG. 7 is an explanatory diagram showing an example of the drive status management table T14. The drive status management table T14 manages each of the drive statuses for each of the virtual drive numbers, for example. Drive statuses can include, for example, "normal", "drive copy in progress" "correction copy in progress", and "correction address", for example.

A "normal" status indicates that the corresponding disk drive 210 is normal. A "drive copy in progress" status indicates that drive coping is being performed on the disk drive 210. A "correction copy in progress" status indicates that correction copy is being performed on the disk drive 210. The "correction address" indicates that the access request from the host 13 is being processed by using each of the other disk drives 210 belonging to the same RAID group 212 as the disk drive 210.

A case where each of the disk drives 210 is running normally is shows at the very top of FIG. 7. If an error count value EC of the disk drive 210 with the virtual drive number "1v" is equal to or more than the first threshold Th1, the status of the error drive "1v" shifts from "normal" to "drive copy in progress" and data copying to the spare drive is started.

FIG. 8 is an explanatory diagram that schematically shows an aspect in which the controller 30 is used by switching the table sets T1 and T2. A current table pointer 36 indicates the table set currently being used.

Here, when the shift is made from drive copy to correction copy, a plurality of states are changed. As a first state change, the drive status of the virtual drive number '1v' is changed from "drive copy in progress" to "correction copy in progress" as shown in the drive status management table T14 shown in FIG. 7.

As a second state change, the drive numbers 1r and 100r are switched as shown in the drive number management table T11 shown in FIG. 4.

If a temporal interval is produced during the time up until the second state change is performed after executing the first state change, correction copy is implemented for drive 1r. Evidently, correction copy must be performed on the drive 100r. Thus, the drive status and drive number are closely related to one another.

Therefore, when the content does not match for just an instant, there is the possibility that an erroneous operation such as an operation in which the copy-destination drive type is mistaken, for example, will be performed. The storage control device of this embodiment performs multi-processor processing and, therefore, there is the possibility of processing being performed by another processor in the interval of the processing performed by a given processor.

Figure 8A:
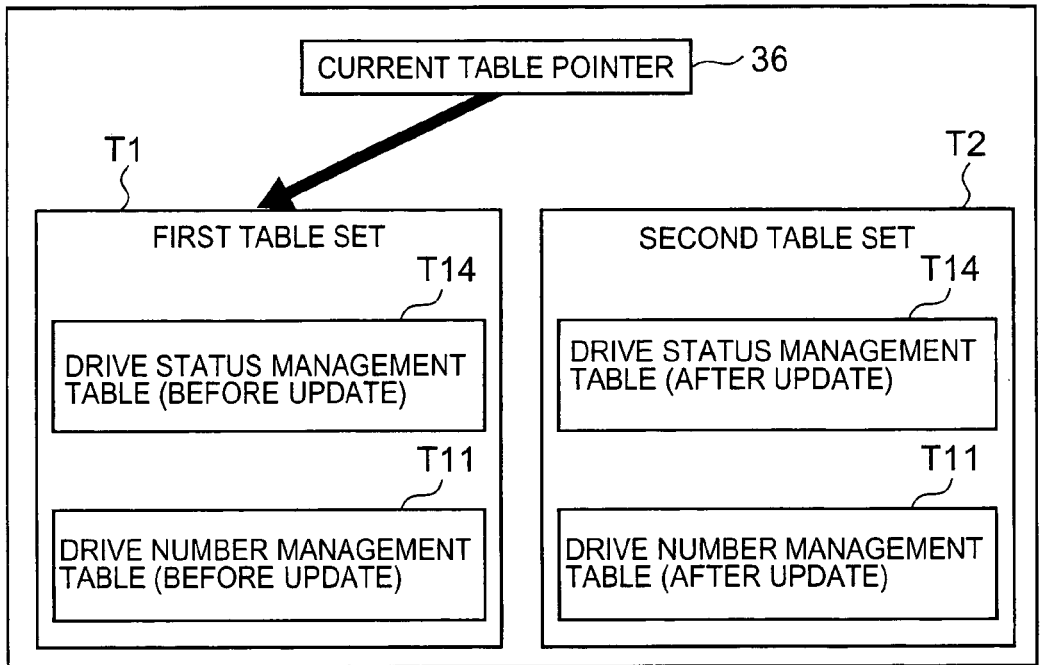
FIG. 8A shows the state prior to switching the table set and FIG. 8B shows the state after switching the table set.

Therefore, as shown in FIG. 8A, in the table set T2 that is not currently being used, the drive number management table T11 and the drive status management table T14, which are closely related to one another, are rewritten beforehand in order to make the shift from drive copy to correction copy.

Figure 8B:
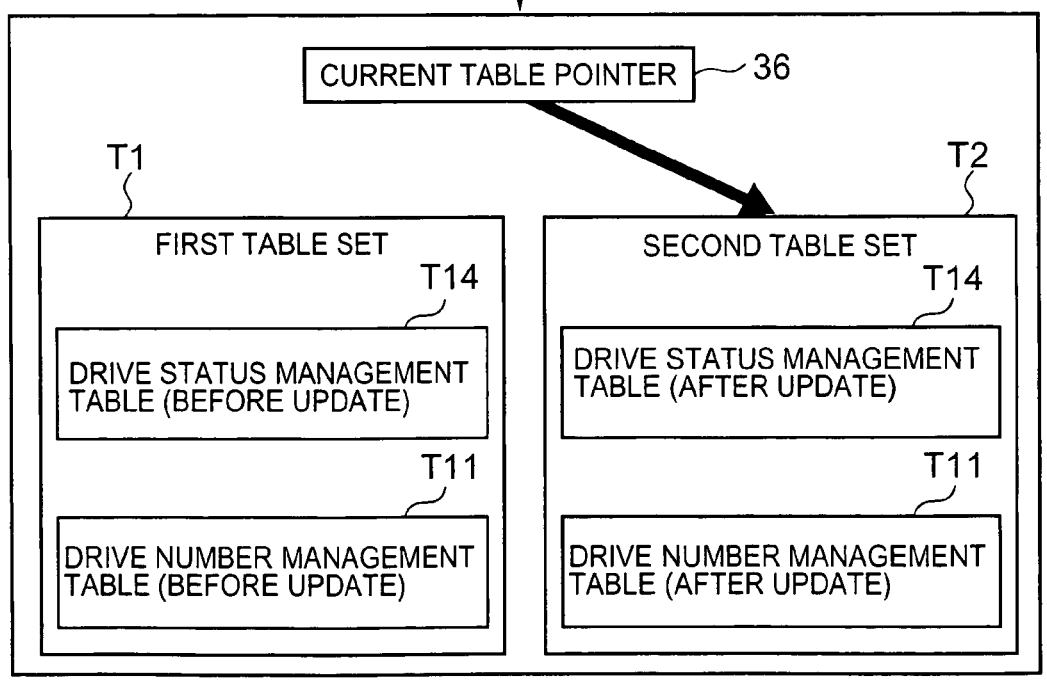

Further, as shown in FIG. 8B, drive-number associations and drive status changes can be performed at the same time by switching the current table pointer 36 from table set T1 to table set T2 after the rewriting of each of tables T11 and T14 has been completed. Therefore, correction copy can be performed by using the copy destination drive that was used in drive copy as is. The copy destination drive is a drive that is mounted on the storage section 20 as the spare drive. In the following description, the copy destination drive will sometimes also be called the recovery destination drive.

Figure 9:
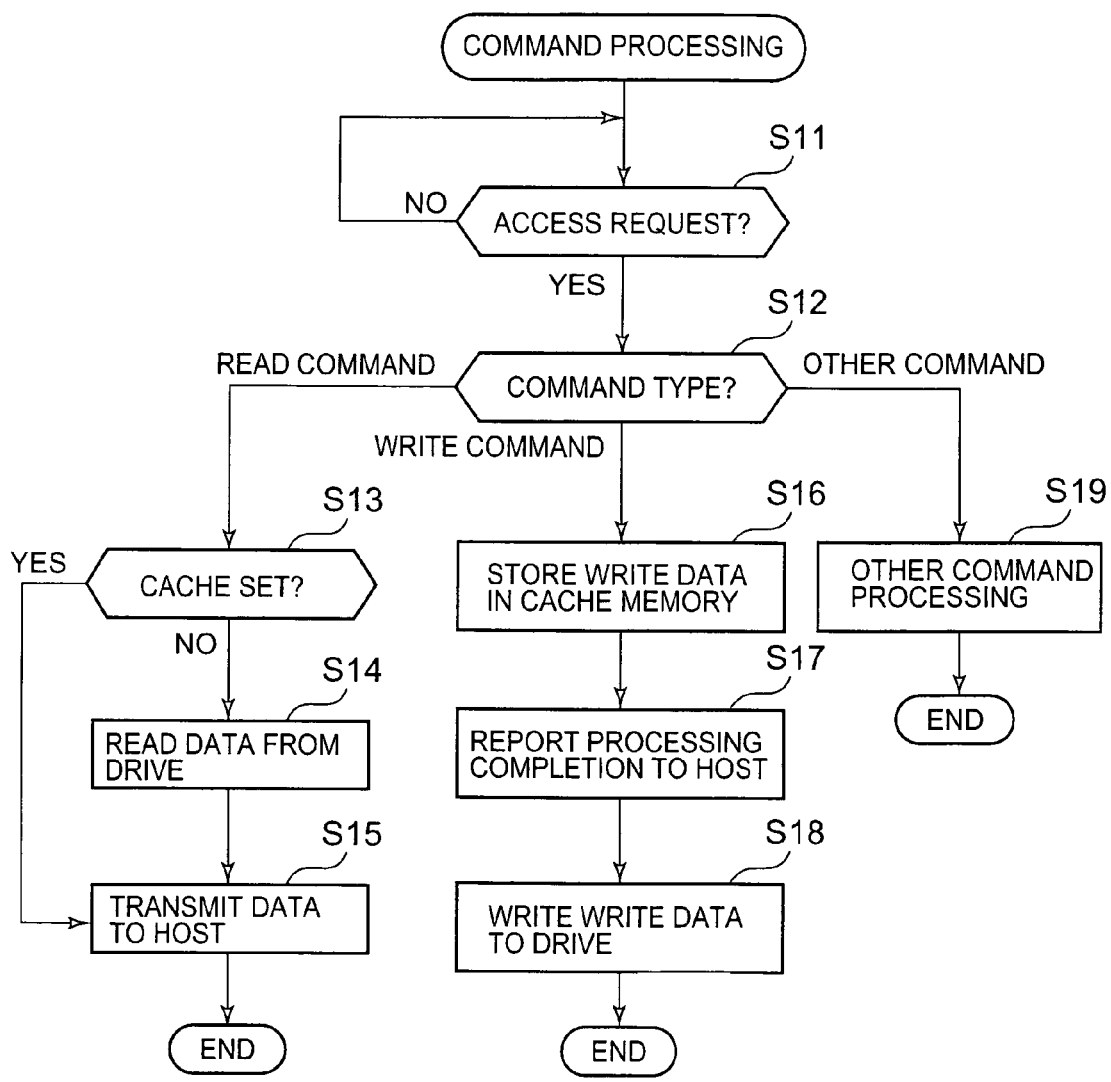
FIG. 9 is a flowchart for managing commands from the host.

FIG. 9 is a flowchart indicating the normal operation of the storage control device 10. In the following description, step 'S' is abbreviated as 'S'. Further, each flowchart is disclosed to the extent required for an understanding and implementation of the present invention and differs from an actual program.

The controller 30 monitors whether an access request has been issued by the host 13 (S11). When an access request has been issued by the host 13 (S11:YES), the controller 30 judges the command type of the access request (S12).

When a read command has been issued by the host 13, the controller 30 judges whether the data requested by the host 13 is stored in the cache memory 130 (S13). When the requested data are stored in the cache memory 130 (S13:YES), the controller 30 reads the data from the cache memory 130 and transmits the data to the host 13 (S15). When the data requested by the host 13 is not stored in the cache memory 130 (S13:NO), the controller 30 reads the requested data from the disk drive 210 and stores the data thus read in the cache memory 130 (S14). Further, the controller 30 transmits the data read from the disk drive 210 to the host 13 (S15).

When a write command has been issued by the host 13, the controller 30 stores the write data received by the host 13 in the cache memory 130 (S16). The controller 30 reports the fact that write command processing is complete to the host 13 at the point where the write data are stored in the cache memory 130 (S17). Thereafter, the controller 30 writes the write data stored in the cache memory 130 to a predetermined disk drive 210 by choosing the appropriate timing (S18)

The predetermined disk drive 210 is a disk drive 210 that constitutes a write-destination logical volume 213 that is designated by the host 13. Further, when parity data are generated as in the case of RAID5 and RAID6, for example, the controller 30 calculates and stores parity data. The parity data are stored in a predetermined parity drive.

Processing that writes write data to the disk drive 210 is called destage processing. The status of the destaged write data is changed from dirty status to clean status. When destage processing is ended, the controller 30 updates the status of the write data. Further, although a system for reporting processing completion to the host 13 at the point where write data are stored in the cache memory 130 is called a write after system or asynchronous writing system, the constitution is not limited to such a system. A constitution in which the end of processing is reported to the host 13 after write data are written to the disk drive 210 is also possible.

When a command issued by the host 13 is not a write command or a read command, the controller 30 executes different command processing (S19). Other commands can include an inquiry command or the like that inquires after the empty capacity or status or the like of the logical volume 213, for example.

Figure 10:
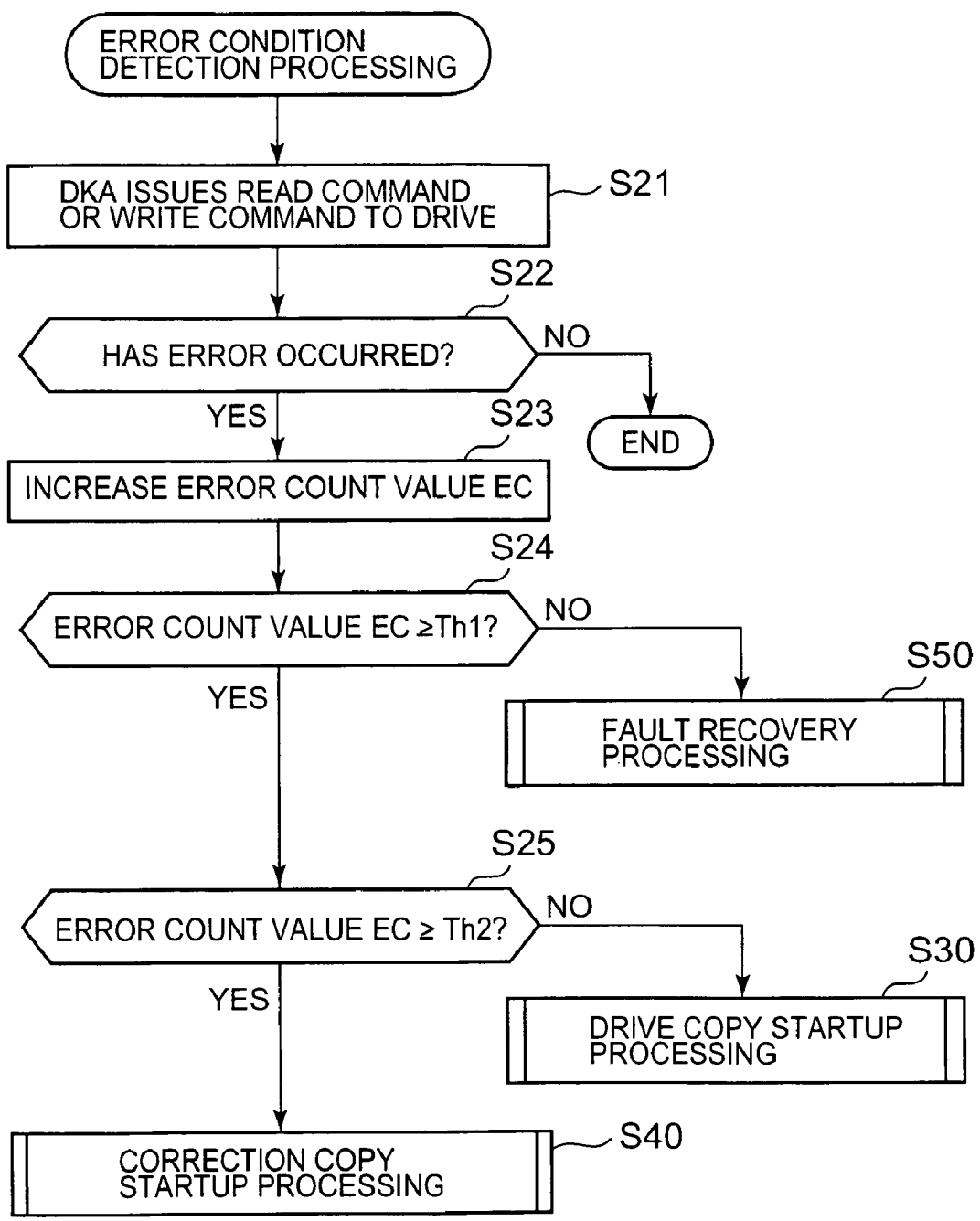
FIG. 10 is a flowchart showing processing for detecting the error condition of a disk drive.

FIG. 10 is a flowchart showing the details of the error condition detection processing 31. The controller 30 (more precisely, the processor in DKA 120) issues a read command or write command to the disk drive 210 (S21).

The controller 30 judges whether an error has been produced on the basis of the response state of the disk drive 210, for example (S22). When an error corresponding to any of the pre-registered error types is detected (S22:YES), the controller 30 increases the error count value EC of the detected error pattern by one for the disk drive 210 in which the error was detected (S23).

The controller 30 judges whether the error count value EC has reached the first threshold Th1 (S24). When the error count value EC has not reached the first threshold Th1 (S24: NO), the controller 30 starts the fault recovery processing 32 (S50). This serves to perform the access request processing corresponding with the error.

When the error count value EC has reached the first threshold Th1 (S24:YES), the controller 30 judges whether the error count value EC has reached the second threshold (S25). When the error count value EC has not reached the second threshold Th2 (S25:NO), the controller 30 starts drive copy processing 33 for the disk drive in which the error occurred (error drive) (S30). Data stored in the error drive is moved to the spare drive in advance, prior to the occurrence of an unrecoverable fault in the error drive and the closing of the error drive. The processing to start drive copy will be described subsequently.

If the error count value EC of the error drive reaches the second threshold Th2 (S25:YES), the controller 30 closes the error drive and starts correction copy processing 34 (S40). The processing to start correction copy will be described further subsequently.

Figure 11:
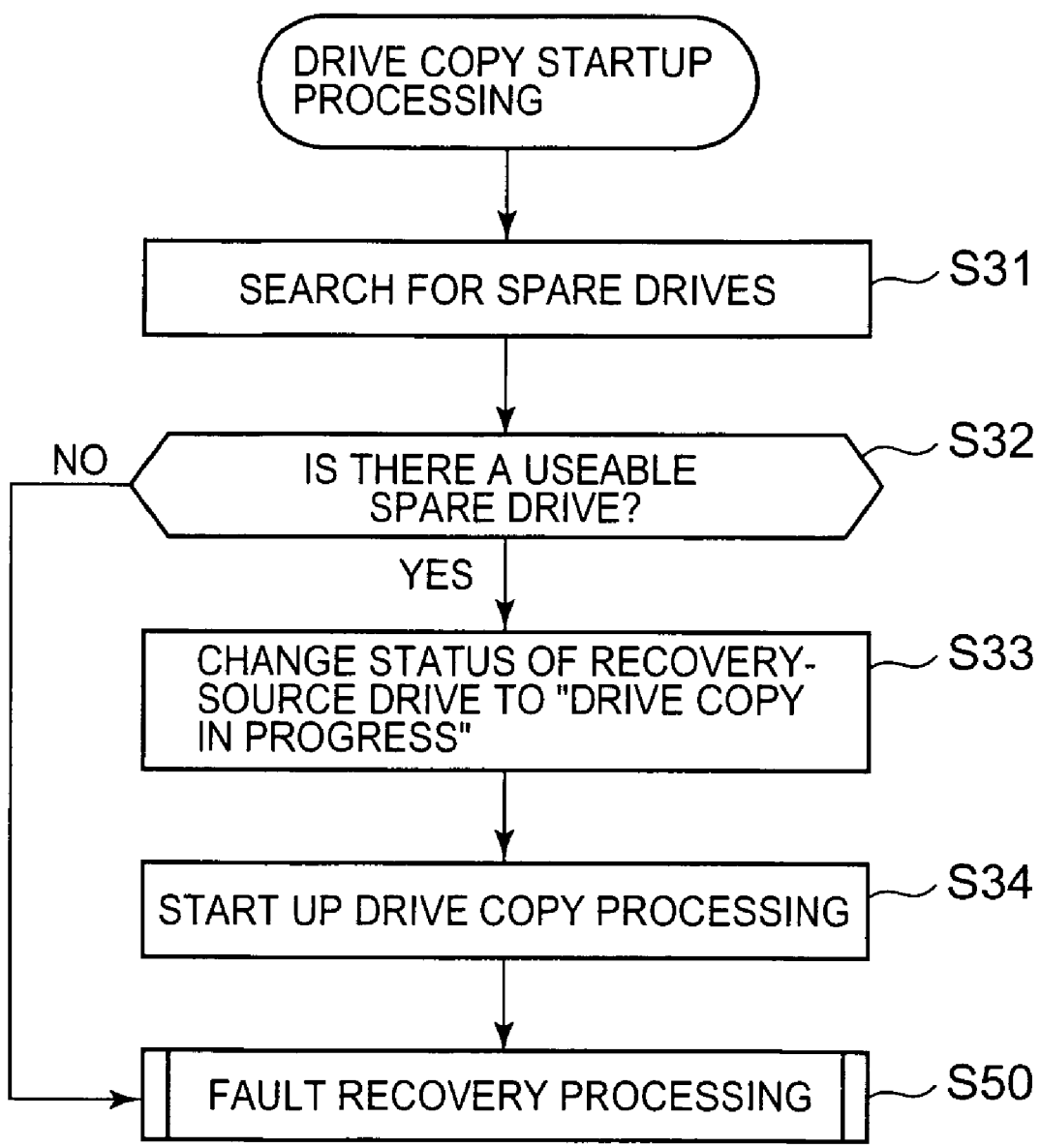
FIG. 11 is a flowchart showing processing for starting up drive copy processing.

FIG. 11 is a flowchart showing the details of drive copy startup processing shown in S30 in FIG. 10. The drive copy startup processing is processing for starting up drive copy processing 33.

The controller 30 searches for spare drives mounted in the storage section 20 (S31), and judges whether a useable spare drive is present (S32). A useable spare drive is an unused disk drive 210 with a storage capacity of at least the same size as the error drive which is the copy source.

When a spare drive that can be used in drive copy cannot be found (S32:NO), because drive copy cannot be performed, the controller 30 executes fault recovery processing 32 and processes access requests from the host 13 (S50).

When a spare drive that can be used for drive copy is found (S32:YES), the controller 30 secures the spare drive as the recovery destination drive and changes the drive status of the error drive (also called the 'recovery source drive') constituting the recovery source to "drive copy in progress" (S33). The controller 30 then starts up the drive copy processing 33 (S34).

More precisely, the flowcharts shown in FIGS. 10 and 11 and the subsequently described flowcharts are executed by the microprocessor in DKA120. The respective disk drives 210 can be operated individually. The DKA120, which detected that the error count value of a certain disk drive 210 is equal to or more than the second threshold Th2, writes a startup message to instruct the start of the drive copy processing to the shared memory 140. This message contains information for specifying the disk drive 210 targeted for drive copy (virtual drive number, for example).

When another DKA 120 finds a message that has been placed in the shared memory 140, the DKA 120 starts the drive copy processing 33. In S34 above, the writing of a startup message to the shared memory 140 was illustrated. Thus, the DKA120 that instructs the start of drive copy processing 33 and the DKA120 that executes the drive copy processing 33 are sometimes different. Consequently, the same DKA120 is sometimes also charged with both the instruction to start drive copy and the execution of drive copy.

Figure 12:
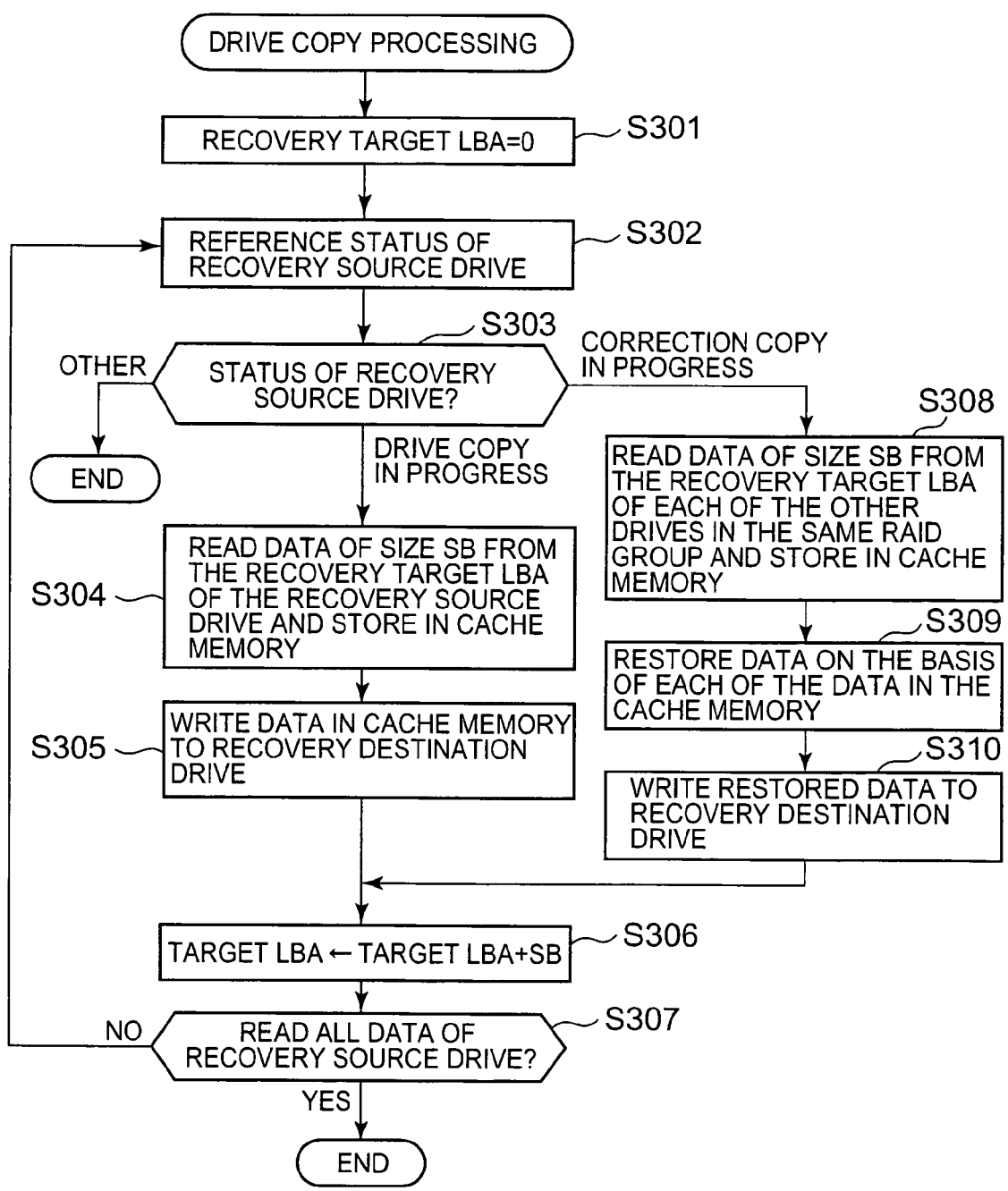
FIG. 12 is a flowchart showing drive copy processing.

FIG. 12 is a flowchart showing the details of drive copy processing 33. First, initially, the controller 30 resets the address of the recovery target ('recovery target LBA' in FIG. 12) to 0 (S301). The recovery target address is the address of the data to be copied. By resetting the address of the recovery target, drive copy is started in order starting from the header address of the data area of the recovery source drive (error drive).

The controller 30 references the drive status management table T14 and confirms the status of the recovery source drive (S302). When the status of the recovery source drive is "drive copy in progress", drive copy as per S304 to S307 is executed. As mentioned in conjunction with FIG. 11, in S33, because the status of the recovery source drive has changed to "drive copy in progress", the processing moves on to S304.

The controller 30 reads data of a predetermined size SB from the recovery target address of the recovery source drive and stores this data in the cache memory 130 (S304). In S301, because the recovery target address is reset, data of size SB is read from the header of the data area of the recovery source drive.

Here, the predetermined size SB can be established as a data size corresponding to eight slots, for example. A slot is the minimum unit for managing the data stored in the cache memory 130. One slot can be constituted by 96 blocks, for example. Therefore, SB can be established as a block number of 8×96=768. This numerical value is an example and the present invention is not limited to this value.

The controller 30 writes data of size SB that has been stored in the cache memory 130 starting from the header of the data area of the recovery-destination disk drive (S305). The recovery-destination disk drive is a secured spare drive. Data of size SB is held in the data area of the recovery destination disk drive in the same storage position as the recovery source drive.

The controller 30 increases the addresses of the recovery target by SB (S306) and judges whether all the data of the recovery source drive has been read (S307). That is, the controller 30 compares the recovery target address with the terminal address of the recovery source drive and judges whether the recovery target address exceeds the terminal address. If data that has not yet been copied remains (S307: NO), the controller 30 returns to S302 and repeats steps S302 to S307 above. As a result, the data stored in the recovery source drive is read in size SB amounts at a time and written to the recovery destination drive. The controller 30 ends the drive copy processing when all the data of the recovery source drive has been copied to the recovery destination drive (S307: YES).

Further, each time the drive copy of S302 to S307 is repeated, the status of the recovery source drive is examined (S303). Therefore, if, during the drive copy, the status of the recovery source drive is changed from "drive copy in progress" to "correction copy in progress", the drive copy is interrupted immediately and shifts to correction copy (S308 to S310).

The status of the recovery source drive is changed to "correction copy in progress" during the correction copy startup processing (S40) mentioned in conjunction with FIG. 10. When the error count value EC detected in the recovery source drive has reached the second threshold Th2, the correction copy startup processing is started and, during this processing, the status of the recovery source drive is changed to "correction copy in progress". The details will be provided subsequently in conjunction with FIG. 13.

The operation of the correction copy will now be described by returning to FIG. 12. When the status of the recovery source drive has changed from "drive copy in progress" to "correction copy in progress", the controller 30 executes S308.

The controller 30 reads data and parity from the other disk drives 210 that belong to the same RAID group 212 as the RAID group 212 to which the recovery source drive belongs and stores the data thus read to the cache memory 130 (S308).

More precisely, the controller 30 accesses the data area of each of the other disk drives 210 in the same RAID group 212 and reads the block data of size SB from the recovery target address.

The controller 30 restores data that has been stored in the recovery source drive on the basis of the respective data and parity stored in the cache memory 130 (S309) and writes the restored data to a predetermined position of the recovery destination drive (S310). The predetermined position is the storage location indicated by the recovery target address.

Here, it must be noted that, first of all, the drive copy (S304 to S306) and the correction copy (S308 to S310, S306) share the management of the recovery target address (S306). Therefore, even when the shift is made to correction copy by interrupting drive copy, correction copy can be started without overlap and without a gap starting from the next storage area for which drive copy has been completed (recovery target address).

Secondly, the fact that correction copy is performed during drive copy processing must be heeded. That is, drive copy and correction copy are not constituted as separate programs (jobs) Rather, the correction copy function is provided integrated within the drive copy processing. Hence, the shift can be made immediately from drive copy to correction copy while maintaining the copy integrity.

Figure 13:
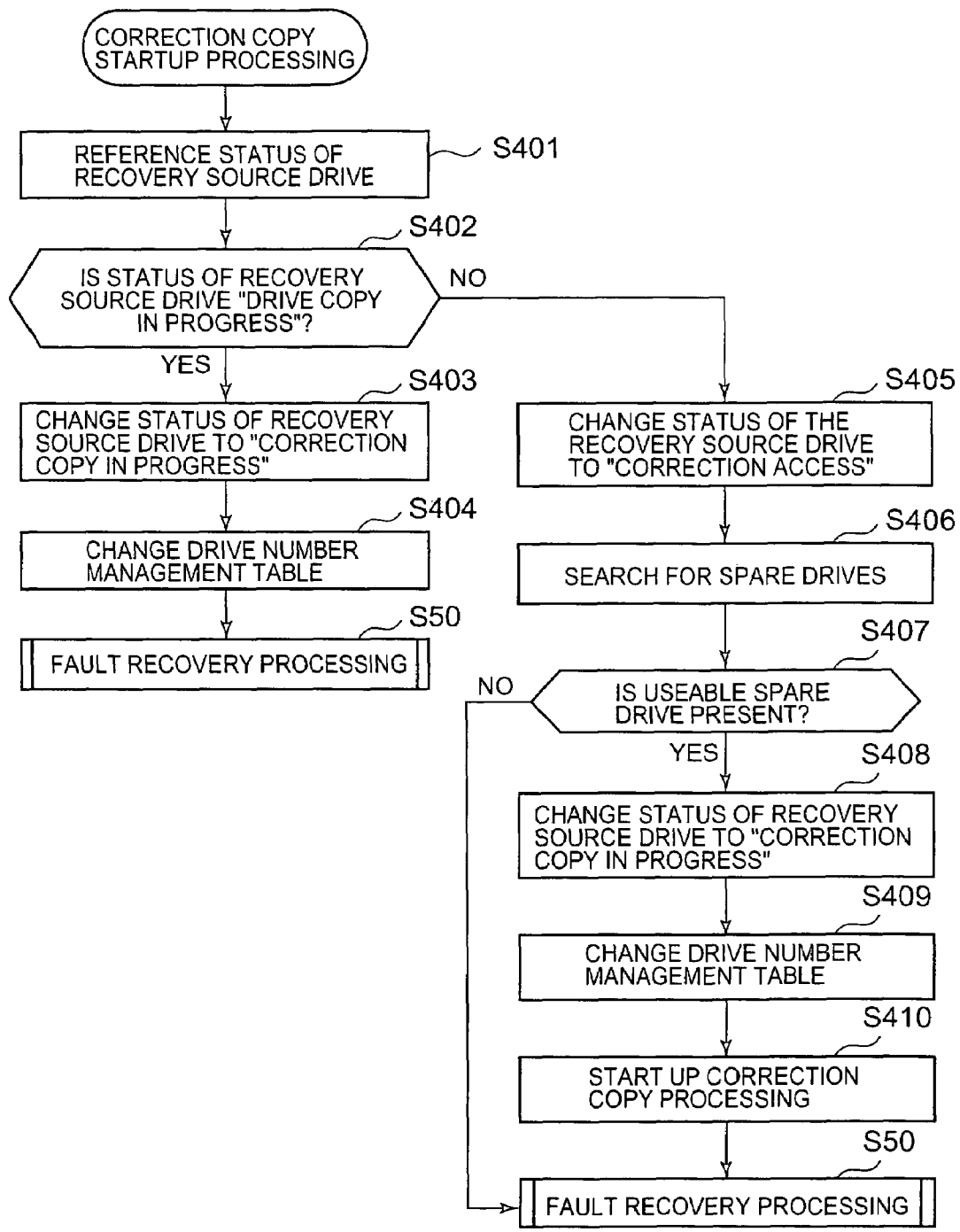
FIG. 13 is a flowchart showing processing for starting up correction copy processing.

Thirdly, it must be noted that switching between drive copy and correction copy is decided by the status of the recovery source drive and the status of the recovery source drive is established by processing other than the drive copy processing (See FIGS. 10, 11, and 13). Therefore, the monitoring of the error condition produced in the recovery source drive and the transfer of data from the recovery source drive to the recovery destination drive can be executed in parallel as separate processes.

In particular, the controller 30 of this embodiment comprises a plurality of processors (the processors in the respective DKA120) and, therefore, the load can be dispersed between each of the DKA120 by preventing a concentration of error condition monitoring processing and copy processing by means of a specified processor (DKA120).

In addition, because each DKA12 operates individually, a DKA120 that makes inputs and outputs to and from the disk drive 210 detects the error condition of the disk drive 210 on the basis of the response state of the disk drive 210 with respect to the data input/output at the time and starts drive copy startup processing and correction copy startup processing and so forth. Further, another DKA120 executes drive copy processing by confirming a message remaining in the shared memory 140 with different timing. Thus, in this embodiment, error condition monitoring processing and copy processing (drive recovery processing) of the disk drives 210 are made to operate in parallel by achieving co-operation between a plurality of DKA120 that operate independently of each other.

Further, in S303, when the status of the recovery source drive is not "drive copy in progress" or "correction copy in progress", the drive copy processing is terminated.

FIG. 13 is a flowchart showing the correction copy startup processing indicated in S40 in FIG. 10. As expressed by means of FIG. 10, when the error count value EC of the disk drive 210 reaches the second threshold Th2, correction copy startup processing (S40) is started.

The controller 30 references the drive status management table T14 and confirms the status of the disk drive (recovery source drive) in which errors have been detected (S401). The controller 30 judges whether the status of the recovery source drive has been established as "drive copy in progress" (S402).

When the status of the recovery source drive is "drive copy in progress" (S402:YES), the controller 30 changes the status of the recovery source drive to "correction copy in progress" (S403) The content of the drive number management table T11 is rewritten at the same time the status is changed (S404). In S404, as mentioned in conjunction with FIG. 5, the virtual drive numbers of the error drive in which errors were detected and the spare drive are switched. Further, the controller 30 executes fault recovery processing (S50).

As mentioned in conjunction with FIG. 8, by switching the current table pointer 36, the changing of the drive status (S403) and the changing of the drive number (S404) are performed at the same time. As a result, as mentioned earlier, the production of an invalid operation such as an operation in which the copy destination drive is mistaken is prevented.

Here, reference is made to FIG. 12. When the status of the recovery source drive is changed to "correction copy in progress" in S403 in FIG. 13, it is judged in S303 in FIG. 12 that there is an instruction to start correction copy. Therefore, the controller 30 interrupts the drive copy and then executes correction copy by repeating each of the following steps in the order S308, S309, S310, S306, S307, S302, S303, and then S308.

Let us return now to FIG. 13. When the status of the recovery source drive is not "drive copy in progress" (S402: NO), the controller 30 changes the status of the recovery source drive to "correction access" (S405). That is, when drive copy processing has not been executed, the status of the recovery source drive is changed to "correction access" (S405).

The controller 30 searches for spare drives (S406) and judges whether a usable spare drive exists (S407). When a usable spare drive is found (S407:YES), the controller 30 changes the status of the recovery source drive to "correction copy in progress" (S408) and, at the same time, switches the virtual drive numbers between the recovery source drive and the spare drive (S409). After making preparations to execute correction copy, the controller 30 instructs the execution of the correction copy (S410) and executes fault recovery processing (S50). As mentioned above, the controller 30 issues an instruction by writing a predetermined message in the shared memory 140, for example.

Here, the correction copy processing whose execution is instructed in S410 is different from the correction copy mentioned in conjunction with FIG. 12. The correction copy in FIG. 12 is constituted as a portion of the drive copy processing. However, the correction copy processing instructed in S410 is separated from the drive copy processing.

Figure 14:
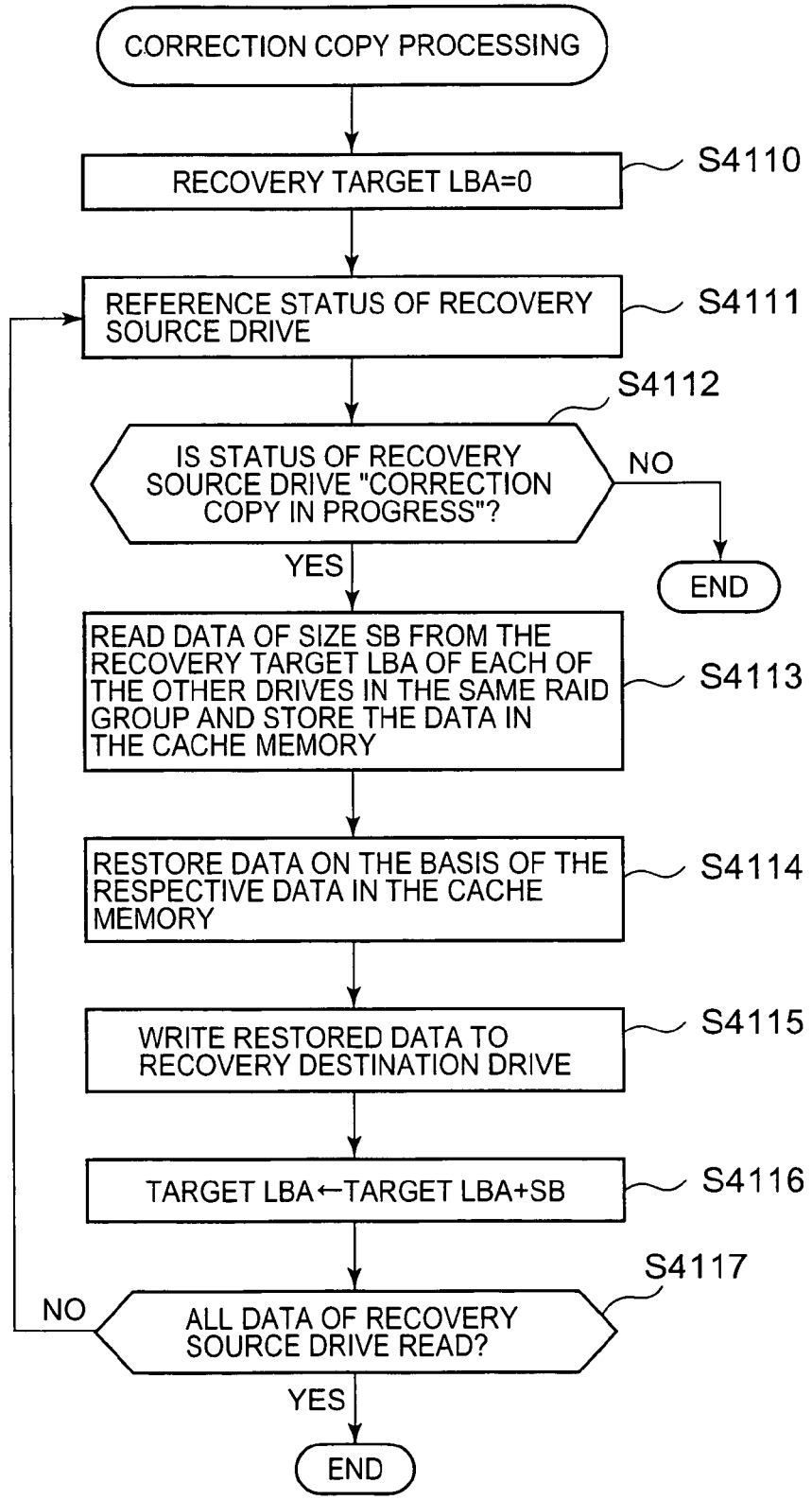
FIG. 14 is a flowchart showing correction copy processing.

FIG. 14 is a flowchart showing the details of the correction copy processing instructed in S410 in FIG. 13. This correction copy processing operates in the same manner as the correction copy mentioned in FIG. 12.

After initializing the recovery target address (S4110), the controller 30 references the status of the recovery source drive by using the drive status management table T14 (S4111) and judges whether the status of the recovery source drive is "correction copy in progress" (S4112).

In S408 in FIG. 13, the status of the recovery source drive is changed to "correction copy in progress" and, therefore, the result of the judgment in S4112 is "YES", whereupon the processing moves to S4113. The controller 30 reads each of the data and parity of size SB from the other disk drives 210 in the RAID group to which the recovery source drive belongs and stores the data and parity thus read to the cache memory 130 (S4113).

The controller 30 restores the data in the recovery source drive on the basis of the data and parity stored in the cache memory 130 (S4114) and writes the restored data in a predetermined position of the recovery destination drive (S4115). After increasing the recovery target address by SB (S4116), the controller 30 judges whether all the data of the recovery source drive have been read (whether all the data have been restored) (S4117). Steps S4111 to S4117 are repeated over the period during which all the data that should be stored in the recovery source drive are restored and copied to the recovery destination drive. That is, the data that should be stored in the recovery source drive are restored in a number of blocks equivalent to SB and then written to the recovery destination drive.

The details of fault recovery processing will now be described on the basis of FIGS. 15 and 16. As also shown in FIGS. 10, 11, and 13, when errors are detected in the disk drive 210, fault recovery processing is executed in order to input and output data by avoiding these errors.

Figure 15:
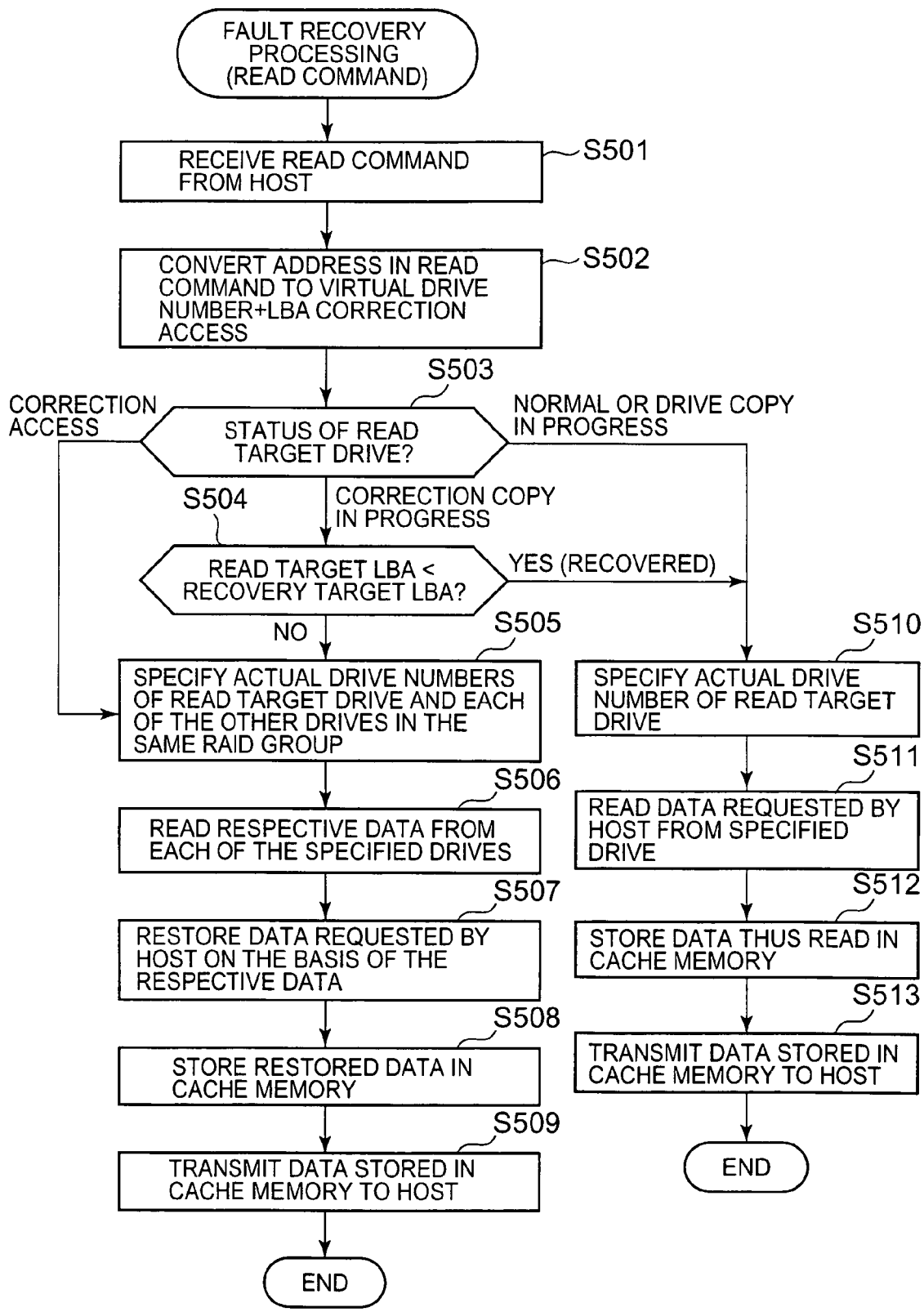
FIG. 15 is a flowchart showing read command processing.

FIG. 15 is a flowchart for processing read commands issued by the host 13 during the period in which errors are detected. Upon receipt of a read command from the host 13 (S501), the controller 30 converts the address in the read command to the format 'virtual drive number+logical block address' (S502).

The controller 30 references the drive status management table T14 and judges the status of the disk drive 210 that is the read target ('read target drive' hereinbelow) (S503).

When the status of the read target drive is "correction copy in progress", the controller 30 judges whether the address of the read target ('read target LBA' in FIG. 15) is smaller than the recovery target address (S504). As mentioned earlier, the data in an amount SB is recovered in order starting from the header address of the data area of the drive. Therefore, when the read target address is smaller than the recovery target address, this signifies a read request to read the recovered data. Conversely, when the read target address is larger than the recovery target address, this signifies a read request to read data that has not yet been restored.

When the read target address is larger than the recovery target address (S504:NO), the controller 30 specifies the actual drive numbers of each of the other disk drives 210 belonging to the same RAID group 212 as the read target drive by referencing the drive number management table T11 (S505). Further, the controller 30 reads each of the other data and parity corresponding with the data for which a read request has been received from each of the specified disk drives 210 (S506) and restores the data for which the read request has been received (S507). After storing the restored data in the cache memory 130 (S508), the controller 30 transmits the restored data to the host 13 (S509).

When it is judged in S503 that the status of the read target drive is "correction access", S504 is skipped and the processing moves on to S505. The controller 30 restores the above-mentioned data (S505 to S508) and transmits data to the host 13 (S509).

In S503, when the status of the read target drive is established as either "normal" or "drive copy in progress", the processing moves on to S510. Further, in cases where the status of the read target drive is "correction copy in progress", when the read target address is smaller than the recovery target address (S504:YES), the processing moves on to S510.

The controller 30 specifies the actual drive number of the read target drive (S510) and reads the data of the read target from the specified disk drive 210 (S511). The controller 30 stores the data thus read in the cache memory 130 (S512) before transmitting the data to the host 13 (S513).

More precisely, the receipt of commands from the host 13 is performed by the CHA110. The CHA110 writes received read commands to the shared memory 140. Each DKA120 references the shared memory 140 as required and, upon finding a read command, reads the requested data from the disk drive 210 and stores the data in the cache memory 130. The DKA120 writes a message to the effect that the requested data has been stored in the cache memory 130 to the shared memory 140. Each CHA110 references the shared memory 140 as required and, upon finding the message from the DKA120, reads the data stored in the cache memory 130 and transmits this data to the host 13.

Figure 16:
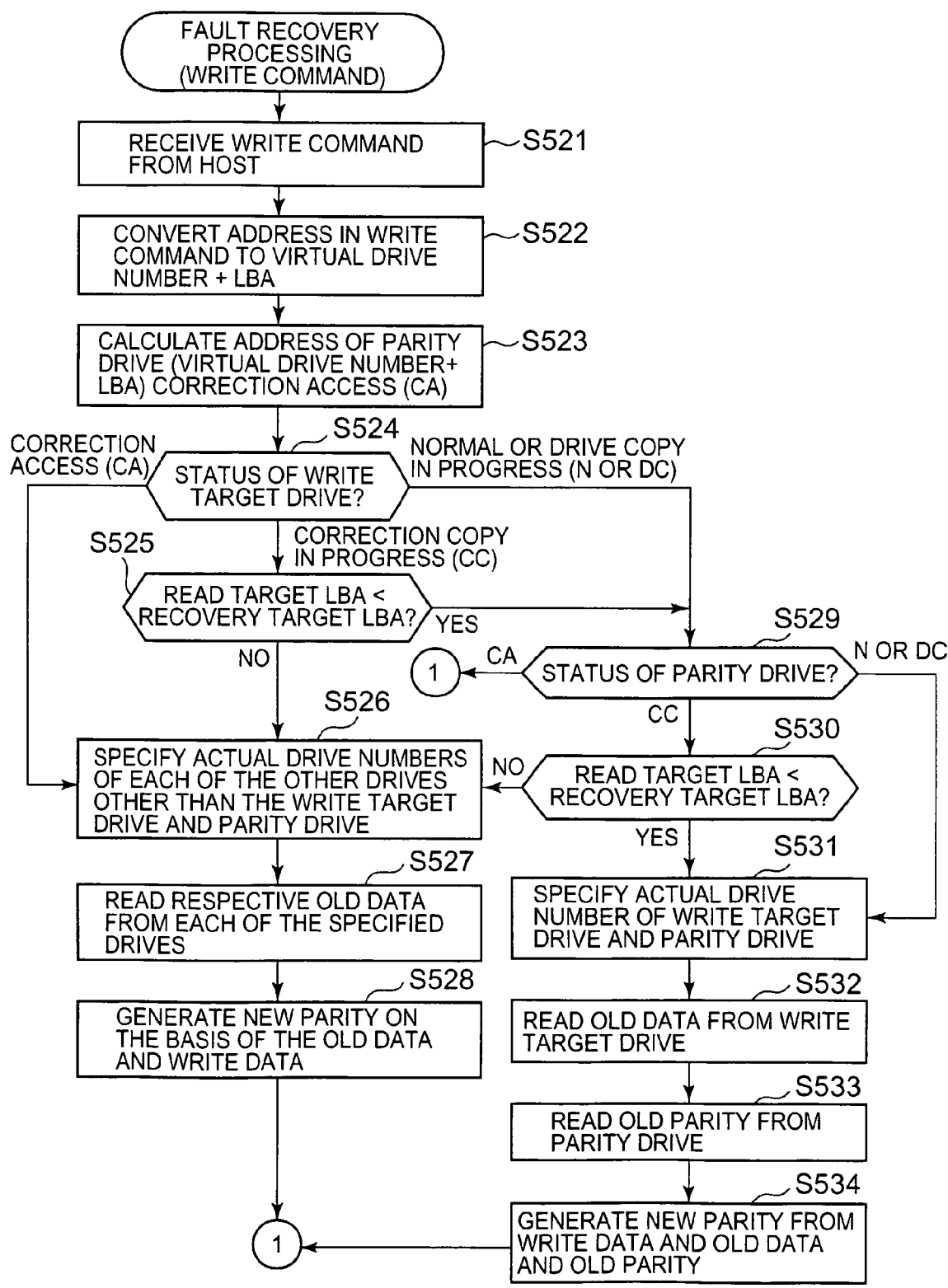
FIG. 16 is a flowchart showing write command processing.

FIG. 16 is a flowchart for processing a write command that is issued by the host 13 during the period in which errors are detected. Upon receipt of the write command from the host 13 (S521), the controller 30 converts the address in the write command in the format 'virtual drive number+logical block address' (S522).

Further, more precisely, as mentioned in FIG. 9, the controller 30 receives the command from the host 13 (S521) and reports the end of writing to the host 13 at the point where the write data has been stored in the cache memory 130 (write after system). Thereafter, the controller 30 executes the steps of S522 and subsequent steps. However, when a fault is produced in the cache memory 130, the end of writing is reported to the host 13 after the completion of destage processing (processing to write write data to a drive).

Following step S522, the controller 30 calculates the address of the old parity relating to the write data (virtual drive number+logical block address) (S523). In the case of RAID5, the drives for storing the parity are not fixed and the parity data are stored in the respective disk drives 210 in a predetermined order. Therefore, the storage destination address of an old parity can be found on the basis of the write target address.

The controller 30 references the drive status management table T14 and judges the status of the write target drive (S524). When the status of the write target drive is "correction copy in progress", the controller 30 judges whether the read target address is smaller than the recovery target address (S525). This is because, in the case of RAID5, a new parity must be calculated by reading the old data before writing the write data.

When the read target address is larger than the recovery target address (S525:NO), the controller 30 specifies the actual drive numbers of each of the other disk drives 210 belonging to the same RAID group 212 as the write target drive (S526).

The controller 30 reads the old data from each of the specified disk drives 210 (S527) and calculates the new parity based on the old data thus read and write data (new data) (S528). The subsequent processing is performed according to the flowchart in FIG. 17 via an association 1.

When the status of the write target drive is "connection access", the controller 30 skips S525, moves on to S526, and calculates the new parity (S526 to S528).

In S524, when the status of the write target drive is judged to be either "normal" or "drive copy in progress", the processing moves on to S529. Further, when the status of the write target drive is "correction copy in progress" and the read target address is smaller than the recovery target address (S525:YES), the processing moves on to S529.

The controller 30 judges the status of the disk drive 210 storing the old parity that was generated with respect to write data-related parity, that is, update target data (S529).

In the case of RAID5, although it is not true that a specified fixed parity drive exists, for the sake of expediency, the disk drive 210 storing the parity to be processed is known as the parity drive. Further, due to space constraints, the following abbreviations are made in the drawings: "correction access" is CA, "correction copy in progress" is CC, "normal" is N, and "drive copy in progress" is DC.

When the status of the parity drive is "correction access (CA)", each of the subsequent steps is skipped and the processing moves on to the association 1. When the status of the parity drive is "correction copy in progress", the controller 30 judges whether the read target address is smaller than the recovery target address (S530). When the read target address is larger than the recovery target address (S530:NO), because the old parity has not yet been recovered, the processing moves on to S526 and a new parity is calculated on the basis of the data read from the other disk drives 210 (S526 to S528).

When the status of the parity drive is either "normal" or "drive copy in progress", the controller 30 skips S530, moves on to S531, and specifies the actual drive numbers of each of the write target drive and the parity drive (S531).

The controller 30 reads old data from the write target drive (S532) and reads the old parity from the parity drive (S533). The controller 30 calculates the new parity on the basis of the write data as well as the old data and old parity (S534).

Figure 17:
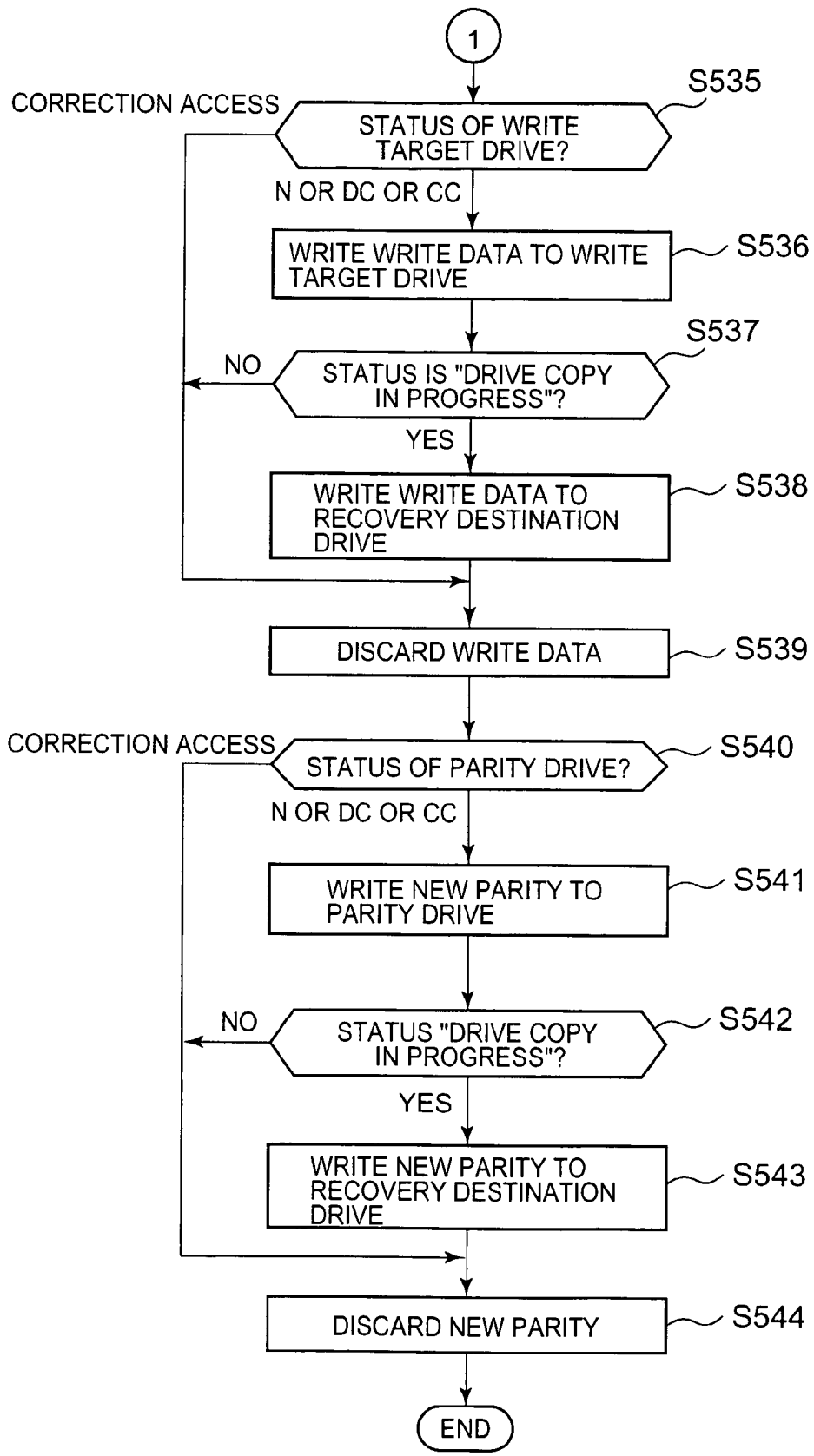
FIG. 17 is a flowchart that follows on from FIG. 16.

FIG. 17 is a flowchart that follows on from FIG. 16. In the flowchart shown in FIG. 17, the writing of the write data to the write target drive (write data destage processing) and the writing of the new parity to the parity drive (parity destage processing) are each executed.

The controller 30 re-judges the status of the write target drive (S535). When the status of the write target drive is any of "normal", "drive copy", and "correction copy in progress", the controller 30 writes write data received by the host 13 to the write target drive (S536).

More precisely, in S536, in the case of "drive copy", write data are written to the recovery source drive. In the case of "drive copy", the writing of write data to the recovery destination drive is performed in S538.

In the case of "correction copy in progress", write data are written to the recovery destination drive (spare drive) in S536. That is, in the case of "correction copy in progress", the write target drive is the recovery destination drive.

Thereafter, the controller 30 judges whether the status of the write target drive is "drive copy in progress" (S537). When the status of the write target drive is "drive copy in progress", the controller 30 also writes write data to the recovery destination drive (S538). That is, the controller 30 stores write data in both the recovery source drive and recovery destination drive. After writing write data to the recovery destination drive, the controller 30 discards write data that has been stored in the cache memory 130 (S539). This is because the writing to the disk drives 210 (destage processing) is complete and the write data need not be saved in the cache memory 130.

When it is judged in S537 that the status of the write target drive is not "drive copy in progress" (S537:NO), the controller 30 skips S538, moves on to S539, and discards the write data in the cache memory 130. The destage processing is completed in S536 when the write target drive is either "normal" or "correction copy in progress" and hence the write data need not be continually saved.

Thereafter, the controller 30 performs parity destage processing. The controller 30 judges the status of the parity drive (S540). When the status of the parity drive is any of "normal", "drive copy", and "correction copy in progress", the controller 30 writes a new parity to the parity drive (S541). Further, the controller 30 judges whether the status of the parity drive is "drive copy in progress" (S542).

When the status of the parity drive is "drive copy in progress" (S542:YES), the controller 30 writes a new parity to the recovery destination drive (S543) and then discards the new parity in the cache memory 130 (S544). When the status of the parity drive is not "drive copy in progress" (S542:NO), the controller 30 skips S543, moves on to S544, and then discards the new parity in the cache memory 130. Further, when it is judged in S540 that the status of the parity drive is "correction access", the controller 30 skips S541 to S543 and discards the new parity (S544).

Write-command and read-command processing methods were described by taking RAID5 by way of example to represent RAID that employs parity. Systems other than RAID5 that implement redundant storage by using parity such as RAID3 or RAID6 are known. The fact that processing is possible by means of RAID3 and RAID6 or the like in basically the same way as RAID5 can be easily understood and implemented by a person skilled in the art. Therefore, the above description is omitted for cases where parity is used and an example of a RAID1 case will be described.

Figure 18:
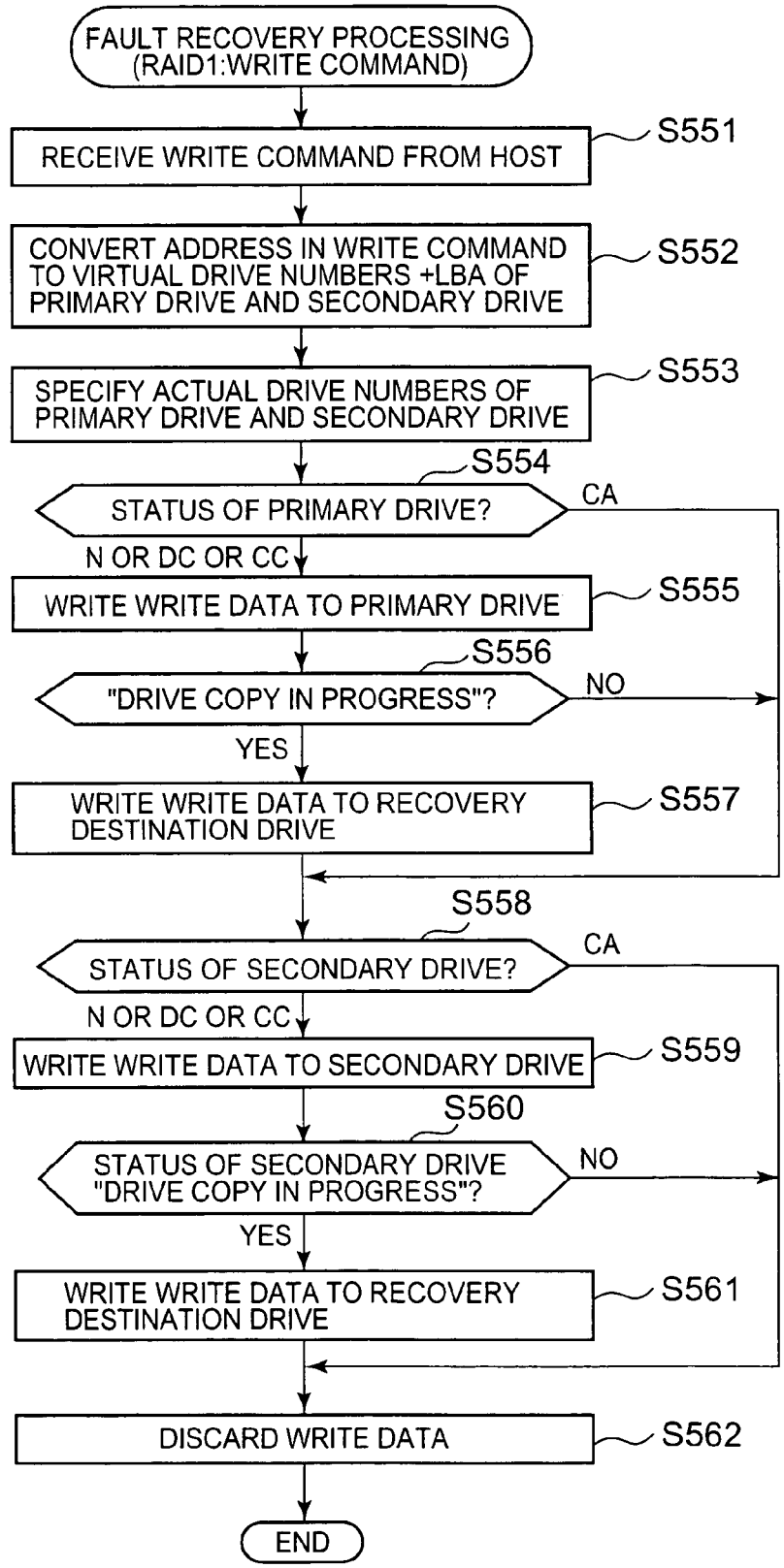
FIG. 18 is a flowchart showing write command processing in the case of RAID1.

FIG. 18 is a flowchart showing write command processing in a RAID1 case. Upon receipt of a write command from the host 13 (S551), the controller 30 converts a write target address in the write command to the format 'virtual drive number+logical block address' (S552). The controller 30 specifies the actual drive numbers of the primary drive and secondary drive by using the drive number management table T11 (S553). The primary drive and secondary drive constitute a mirroring pair and each hold the same stored content.

The controller 30 confirms the status of the primary drive (S554). When the status of the primary drive is any of "normal", "drive copy in progress" or "correction copy in progress", the controller 30 writes write data to the primary drive (S555).

The controller 30 judges whether the status of the primary drive is "drive copy in progress" (S556) and, when the status is "drive copy in progress" (S556:YES), the controller 30 also writes write data to the recovery destination drive (S557). Further, when it is judged in S554 that the status of the primary drive is "correction access", S555 to S557 are skipped and the processing moves on to S558.

Thereafter, the controller 30 judges the status of the secondary drive (S558). As per the primary drive case, when the status of the secondary drive is any of "normal", "drive copy in progress", and "correction copy in progress", the controller 30 writes write data to the secondary drive (S559).

When the status of the secondary drive is "drive copy in progress" (S560:YES), the controller 30 also writes write data to the recovery destination drive (S561) before discarding the write data in the cache memory 130 (S562).

When the status of the secondary drive is either "normal" or "correction copy in progress", the controller 30 skips S561 and discards the write data stored in the cache memory 130 (S562). Further, when it is judged in S558 that the status of the secondary drive is "correction access", S559 to S561 are skipped and the write data in the cache memory 130 are discarded (S562).

Because this embodiment is constituted as described above, the following effects are afforded. This embodiment is capable of performing correction copy starting from the drive copy interrupt position by taking over the copy pointer (recovery target address) used in the drive copy when the transition is made from drive copy to correction copy. Therefore, the drive recovery time can be shortened by preventing futile overwriting of copied areas. As a result, this embodiment makes it possible to suppress a drop in responsiveness during drive recovery and increase user-friendliness and reliability.

In this embodiment, it is judged whether the processing target data has been recovered and, when the data has been recovered, the recovered data are used to process read commands and write commands and so forth (See S504 in FIG. 15 and S525 in FIG. 16). Therefore, the data that has already been recovered can be used effectively and durability with respect to a duplication fault of the disk drive can be increased.

In particular, in a large-capacity disk drive 210, for example, when the transition to correction copy is made at a point close to where drive copy is complete, this embodiment affords superior effects. If correction copy is performed starting from the header address of the large-capacity disk drive 210, the area copied by the drive copy is wastefully overwritten and it therefore takes a long time until correction copy is complete. On the other hand, in this embodiment, because correction copy is started from the drive copy interrupt position, futile copying can be prevented by making use of the range copied by the drive copy. Therefore, the time until the correction copy is complete can be markedly shortened. Further, when the transition is made to correction copy close to completion of the drive copy, a large portion of the data is copied to the recovery destination drive by the drive copy. Therefore, even when a fault is produced in another disk drive 210, an access request from the host 13 can be processed by using data that has been copied by the drive copy, whereby resistance to duplication faults of the disk drive can be increased and the reliability of the storage control device 10 can be improved.

This embodiment has a constitution in which switching of the virtual drive numbers of the recovery source drive and spare drive and changes to the drive status are both performed at the same time by switching the first table set T1 and second table set T2. Hence, consistency between drive copy and correction copy can be maintained by securing the same spare drive even when the state is changed from drive copy to correction copy.

This embodiment is constituted to perform correction copy during drive copy processing. That is, this embodiment integrates drive copy and correction copy into one job. The transition from drive copy to correction copy can therefore be made smoothly.

Second Embodiment

A second embodiment will now be described on the basis of FIGS. 19 to 21. Each of the following embodiments including this embodiment corresponds to a modified example of the first embodiment. In each of the following embodiments, a description of the constitution that is common to the above constitution is omitted and the focus of the description is on the characterizing parts. In this embodiment, when the recovery destination drive is updated by the host 13, the updated parts are managed by means of a bitmap. It is then judged whether the data to be processed has been recovered on the basis of the bitmap.

Figure 19:
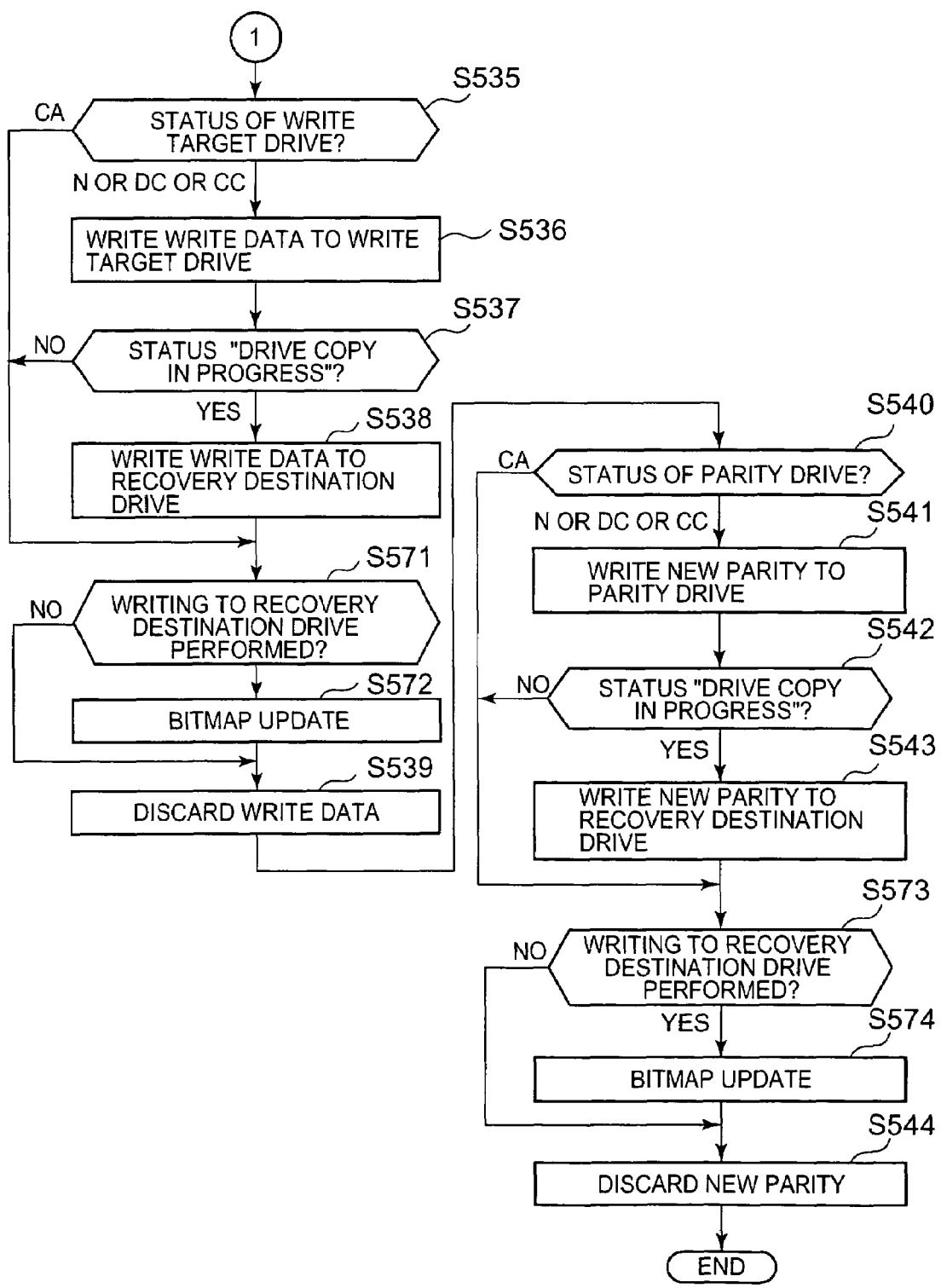
FIG. 19 is a flowchart showing the important parts of write command processing that is executed by a storage control device according to a second embodiment.

FIG. 19 is a portion of a flowchart for a case where a write command is received from the host 13 during the error production period. The flowchart corresponds with the flowchart shown in FIG. 17 and follows on from the flowchart shown in FIG. 16.

Therefore, the flowchart in FIG. 19 comprises steps (S535 to S544) common to the flowchart in FIG. 17. When the focus of the description is on the steps characteristic of this embodiment, this embodiment writes write data to the recovery destination drive (S538) before the controller 30 judges whether the writing to the recovery destination drive has been performed (S571).

Here, in S571, a check is made of whether write data has been written to a recovery destination drive in the "correction copy in progress" state or a recovery destination drive in the "drive copy in progress" state. Further, upon detecting writing to the recovery destination drive (that is, data update) (S571: YES), the controller 30 updates the bitmap T15 shown in FIG. 20 (S572).

Likewise, when a new parity is written to the recovery destination drive (S543), the controller 30 stores the position in which the new parity was written to the recovery destination drive in the bitmap T15 (S573, S574).

Figure 20:
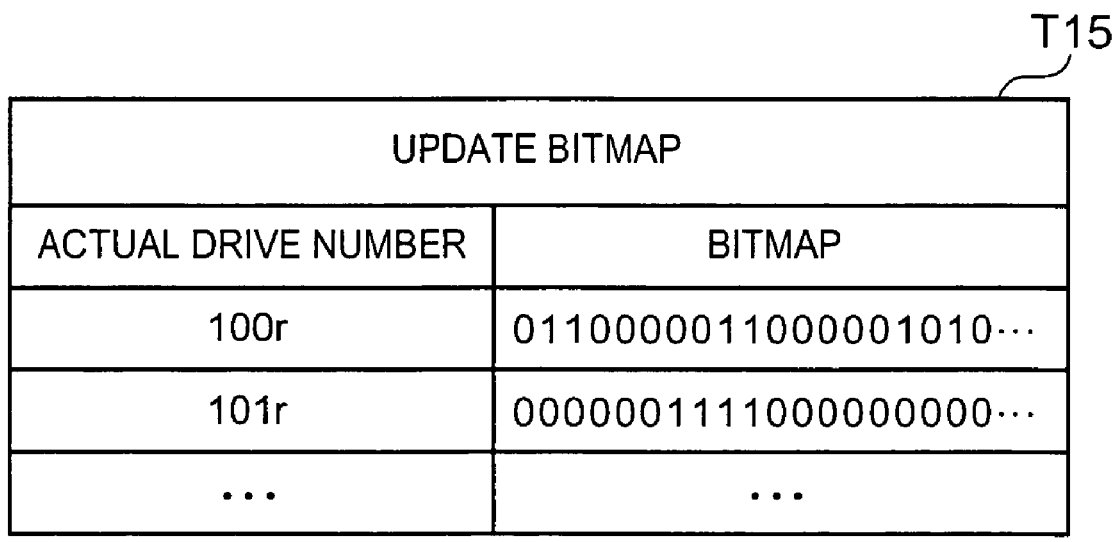
FIG. 20 is an explanatory diagram showing a bitmap for managing the update condition of a recovery-destination drive.

FIG. 20 shows an example of the bitmap T15 for managing the update position. The bitmap T15 associates the bit data (update flag) indicating whether each block has been updated with each actual drive number, for example. That is, each bit corresponds to each block in the disk drive 210. Bit "0" indicates that the block has not been updated and bit "1" indicates that the block has been updated.

Figure 21:
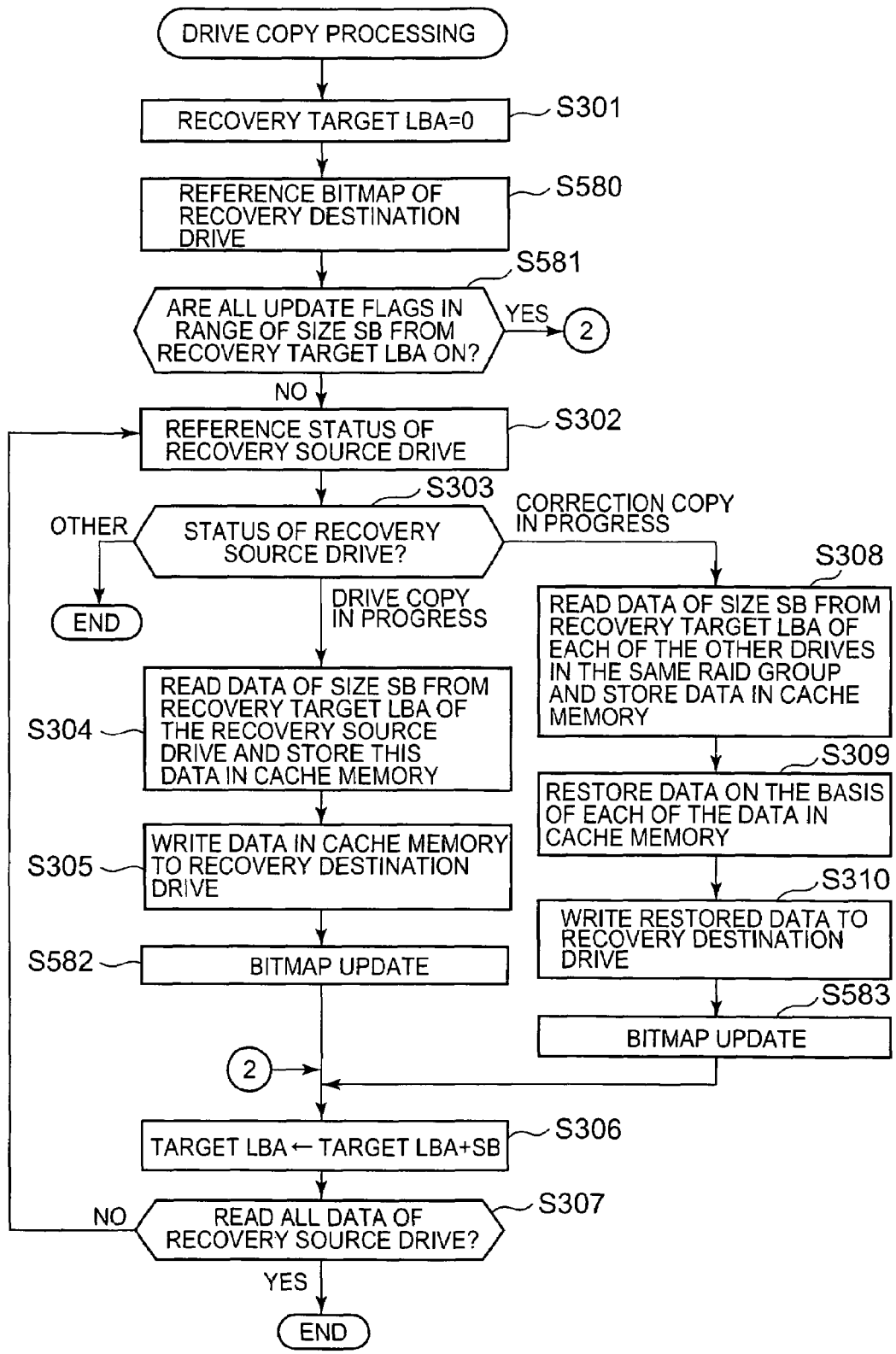
FIG. 21 is a flowchart showing drive copy processing.

FIG. 21 is a flowchart showing the drive copy processing of this embodiment. The flowchart corresponds to the flowchart shown in FIG. 12 and comprises the common steps (S301 to S310).

In this embodiment, the controller 30 initializes the recovery target address (S301) and then references the bitmap T15 relating to the recovery destination drive (S580) before confirming the status of the recovery source drive (S302). Further, the controller 30 judges whether the update flags of all the blocks within size SB from the recovery target address have been set to "1" (S581).

When the update flags have been set to "1" for all the blocks of size SB from the recovery target address (S581:YES), this signifies that the range to be copied to the recovery destination drive has already been updated by the host 13. That is, there is no need to copy SB's worth of block data from the recovery source drive to the recovery destination drive. Therefore, the controller 30 moves on to S306 without performing drive copy and correction copy.

On the other hand, when "0" has been set for the update flag of any one block among all the blocks of size SB from the recovery target address (S581:NO), the controller 30 executes drive copy or correction copy as mentioned in FIG. 12.

Further, after copying block data of size SB to the recovery destination drive (S305, S310), the controller 30 updates the bitmap T15 of the recovery destination drive (S582, S583). Because this serves to manage all the writing to the recovery destination drive, S582 and S583 are not necessarily required in this embodiment. However, the bitmap T15 updated in S582 and S583 is used effectively in the subsequent embodiments.

The embodiment, which is constituted in this way, affords operating effects similar to those of the first embodiment. In addition, in this embodiment, the conditions of updates to the recovery destination drive by the host 13 are managed by the bitmap T15 and it is judged whether copying is a necessity (S581). Further, this embodiment is constituted such that drive copy or correction copy is performed only when it is judged that copying is a necessity. Hence, a drive can be recovered more efficiently by suppressing the possibility of futile drive copy being performed.

Third embodiment

Figure 22:
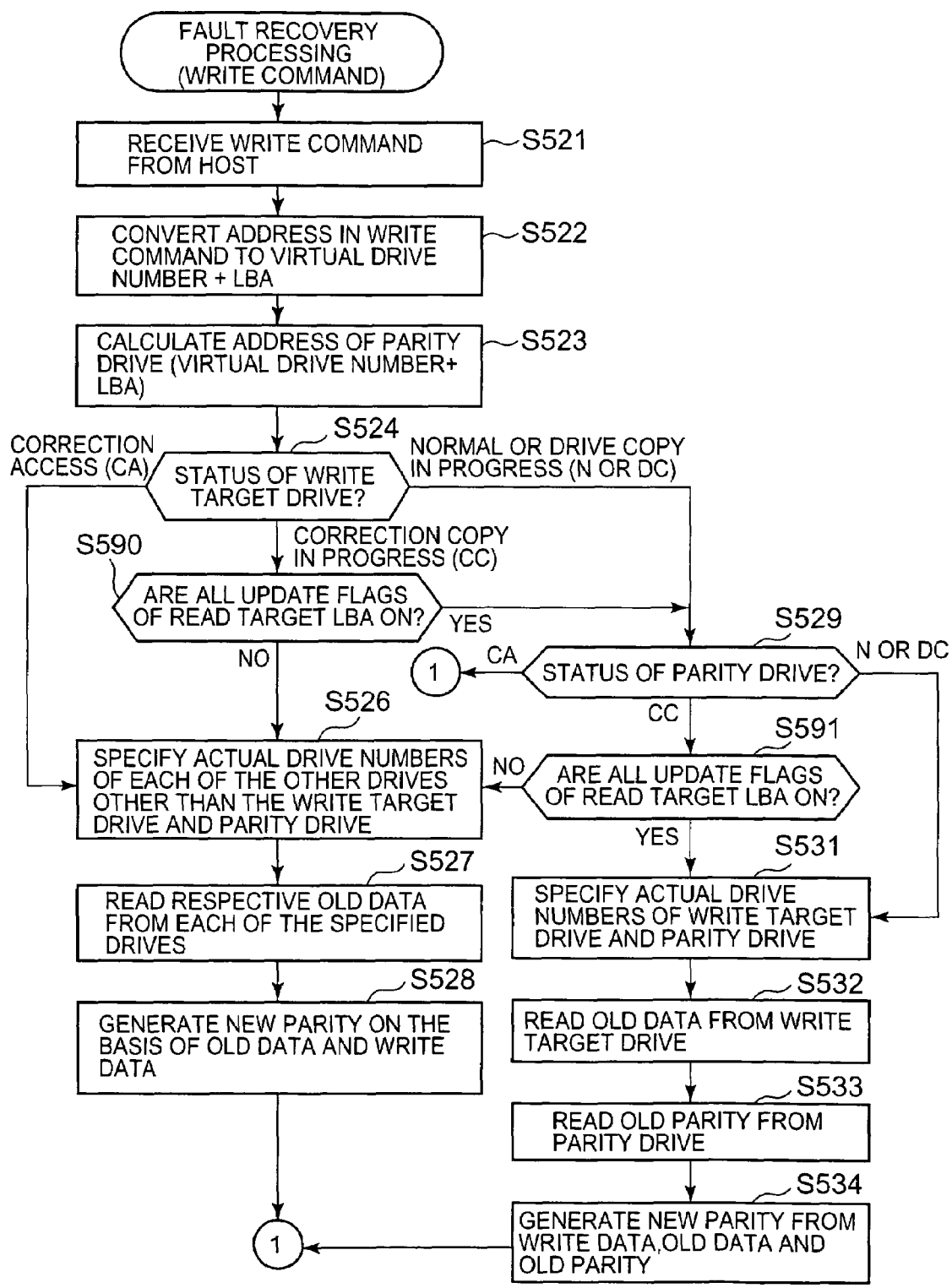
FIG. 22 is a flowchart showing the essential parts of write command processing that is executed by a storage control device according to a third embodiment.

A third embodiment will now be described on the basis of FIG. 22. This embodiment further enhances the second embodiment and judges, based on the bitmap T15, whether the data to be processed has been recovered. FIG. 22 follows on from the flowchart shown in FIG. 19 via the association 1.

FIG. 22 is a flowchart for processing write commands. This flowchart corresponds to the flowchart shown in FIG. 16 and has the steps other than S525 and S530 in common. That is, in this embodiment, S590 and S591 are adopted instead of S525 and S530. In S590 and S591, logical block addresses are not compared and it is judged whether data are recovered data on the basis of the update flags of read target addresses.

That is, the controller 30 judges whether all the update flags relating to the block data for which a read request has been received have been set to "1" by referencing the bitmap T15 (S590, S591). When all the blocks to be read have update flags set to "1", it is judged that the block data have been recovered. Further, the constitution is also the same in the case of a read command. That is, S504 in FIG. 15 may be substituted with S590 (S591) in FIG. 22.

This embodiment also affords the same operating effects as the first and second embodiments. In addition, this embodiment is capable of effectively using the bitmap T15 even during command processing by the host 13.

Fourth Embodiment

A fourth embodiment will now be described on the basis of FIGS. 23 to 25. In this embodiment, as in the case of RAID6, for example, a case where a plurality of correction copies are started up within the same RAID group 212 will be described. In this embodiment, copying in a range corresponding to that of the correction copy whose processing is delayed is also performed by means of correction copy whose processing is performed first. In this embodiment, the update condition of the recovery destination drive is managed by means of the bitmap T15 in the same way as in the second embodiment.

FIG. 23 is an explanatory diagram that schematically shows an aspect of the drive recovery by means of RAID6. As shown in FIG. 23A, a RAID6 redundant storage area is formed by means of a plurality of disk drives 210 (#0 to #5). Among the respective disk drives 210, two are used to store parity of different types, while data are stored in the remaining disk drives 210. In the description of FIG. 23, parity is stored in the disk drives 210 (#4, #5).

Figure 23A:
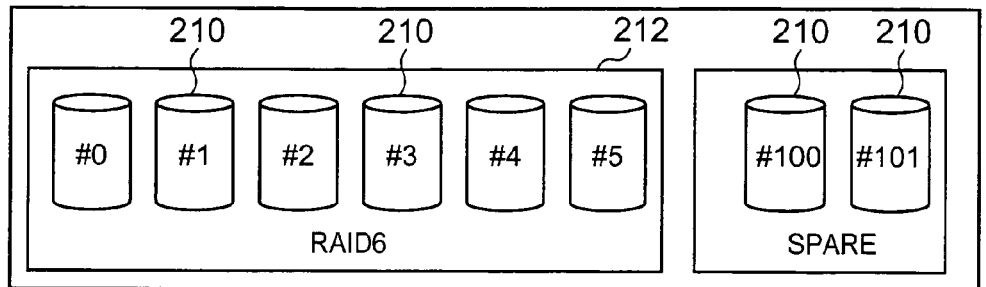
FIG. 23 is an explanatory view that schematically shows an aspect in which a plurality of correction copies are executed by a storage control device according to a fourth embodiment.
Figure 23B:
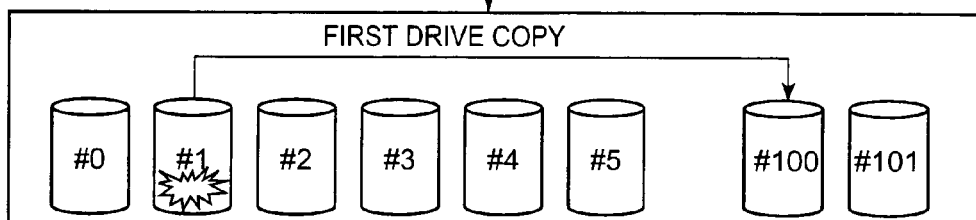

As shown in FIG. 23B, when errors equal to or more than the first threshold Th1 are detected in the disk drive 210 (#1), a first drive copy from the disk drive (first error drive (#1)) to the first spare drive (#100) is started in preparation for future fault production.

Figure 23C:
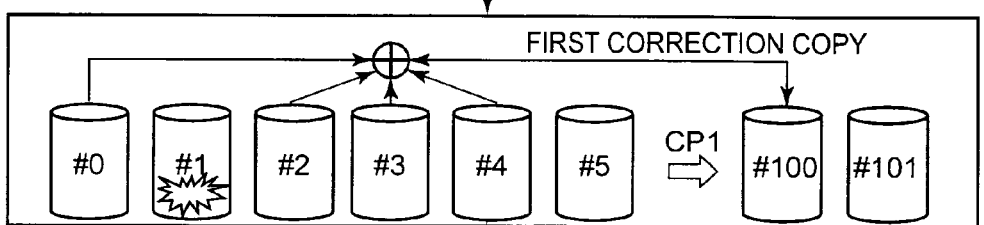

As shown in FIG. 23C, if errors equal to or more than the second threshold Th2 are produced in the first error drive (#1), the first correction copy is started from an interrupt position CP1 of the first drive copy by using the first spare drive (#100). That is, the controller 30 reads data and parity from the other disk drives 210 (#0, #2 to #4) and restores the data in the first error drive (#1). The restored data is stored in the first spare drive (#100). Further, here, only either parity is used among the parity of two types.

Figure 23D:
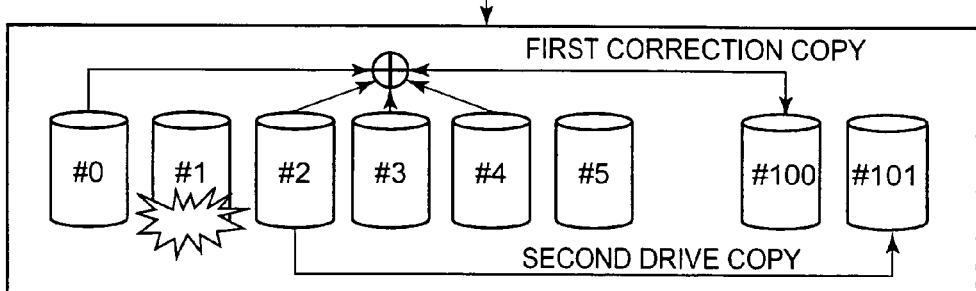

As shown in FIG. 23D, when errors equal to or more than the first threshold Th1 are detected in another disk drive 210 (#2), a second drive copy from the disk drive (second error drive (#2)) to a second spare drive (#101) is started.

Figure 23E:
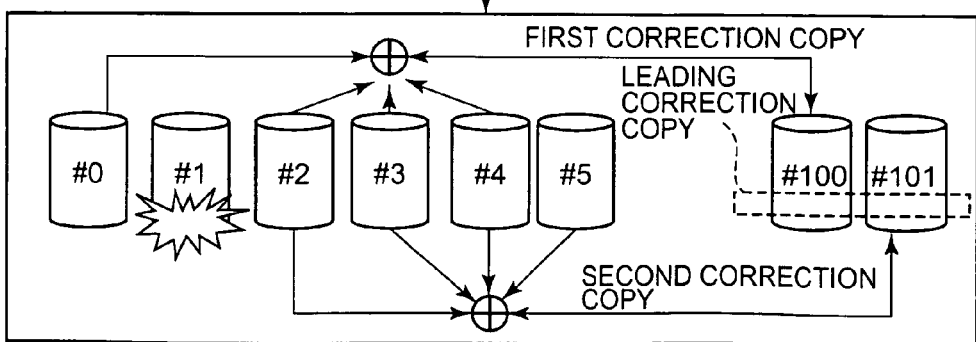

As shown in FIG. 23E, if errors equal to or more than the second threshold Th2 are detected in the second error drive (#2), a second correction copy is started from the interrupt position of the second drive copy by using the second spare drive (#101). Both of the two types of parity are used by means of the second correction copy.

Here, when the processing of the first correction copy precedes the processing of the second correction copy, the first correction copy also processes the part that the second correction copy is charged with at the same time. As a result, data that has been restored by means of the second correction copy can be used effectively and the processing load of the second correction copy can be reduced by omitting duplicate data restoration processing.

Figure 24:
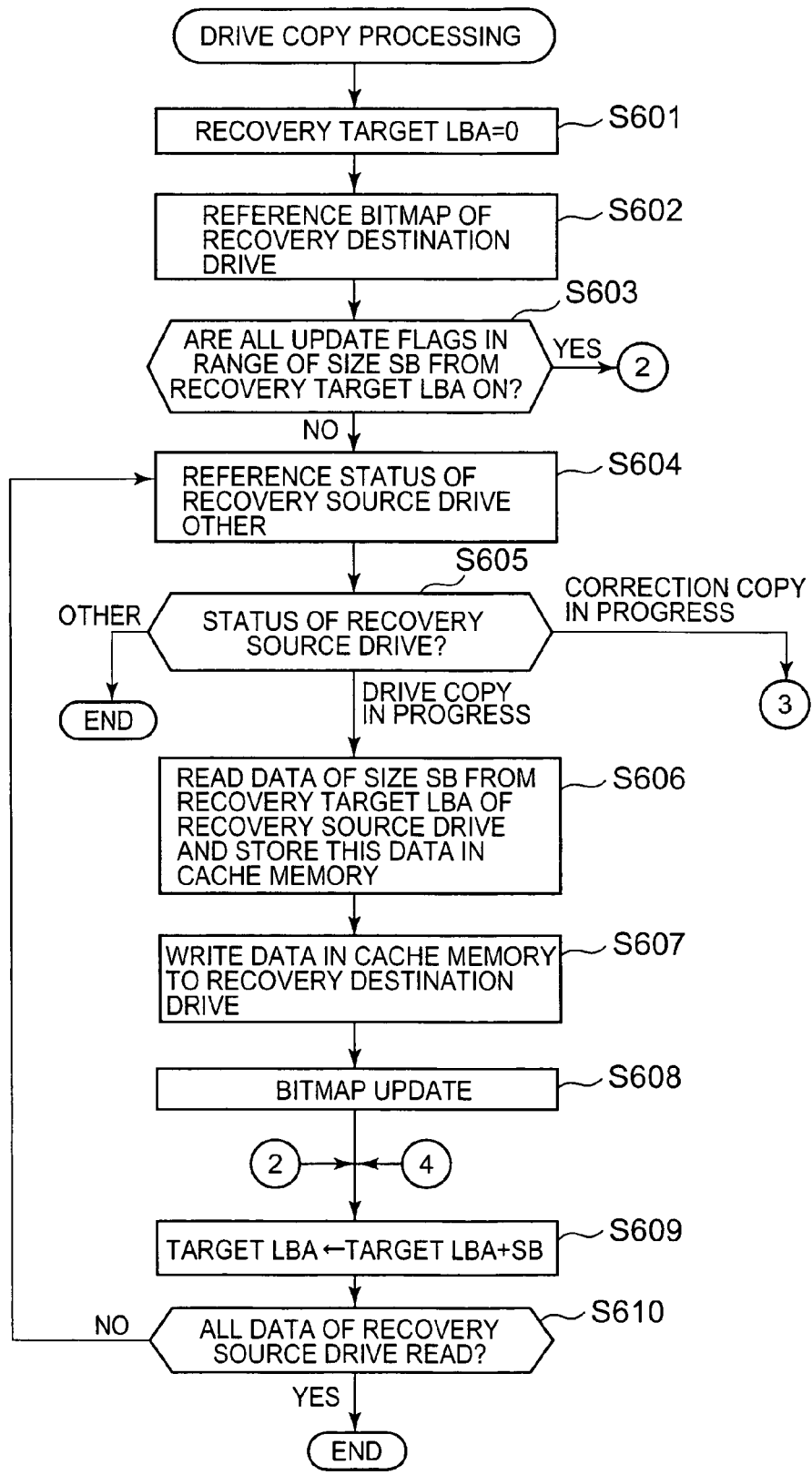
FIG. 24 is a flowchart of drive copy processing.
Figure 25:
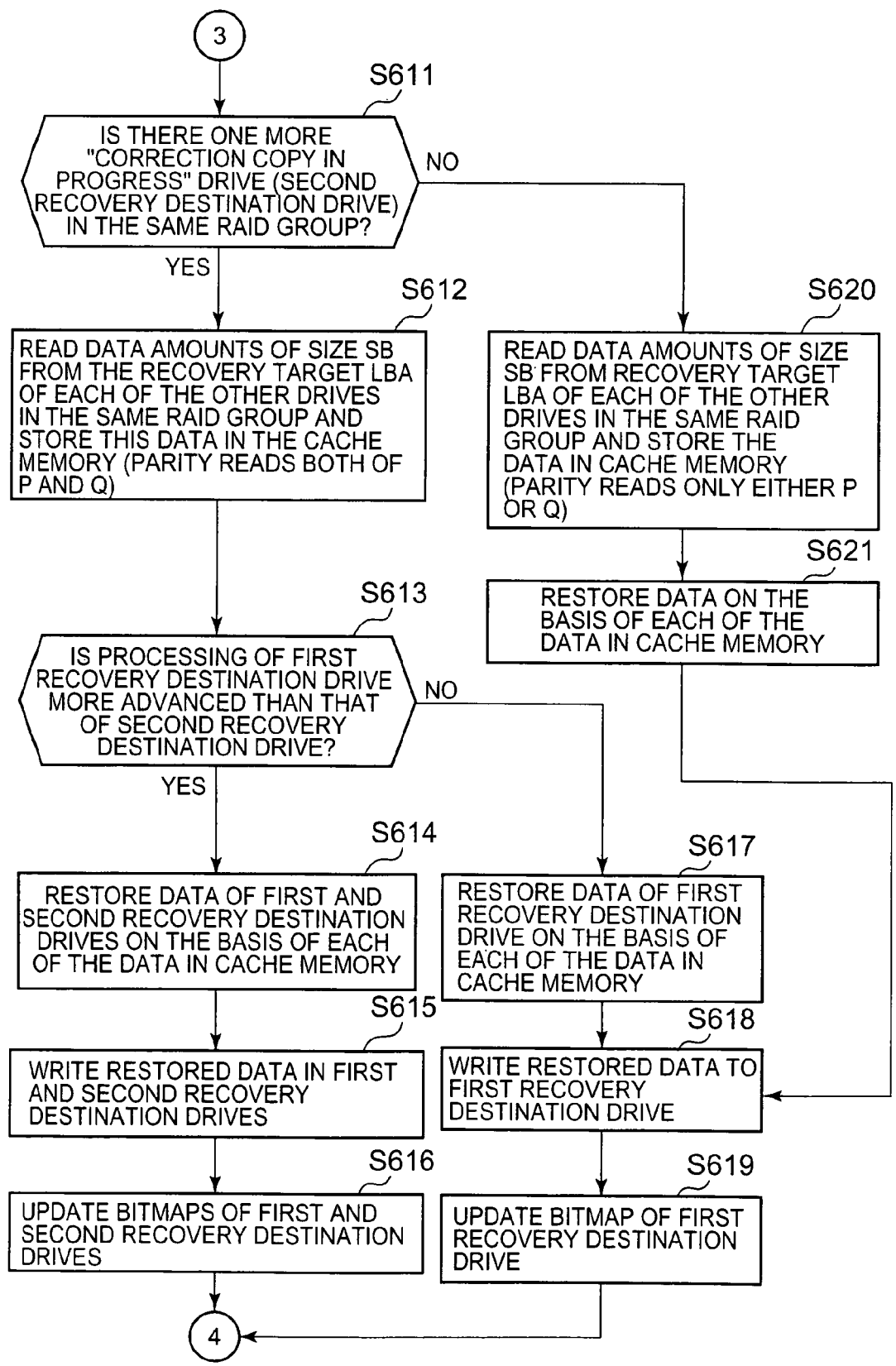
FIG. 25 is a flowchart that follows on from FIG. 24.

FIGS. 24 and 25 are flowcharts for the drive copy processing of this embodiment. First, the controller 30 initializes the recovery target address (S601) and references the bit map T15 relating to the recovery destination drive (S602).

The controller 30 judges whether the update flags have been set to "1" for all the blocks of size SB from the recovery target address (S603). When all the blocks in the range SB that are to be copied thereafter have been updated by the host 13 (S603:YES), there is no need to copy the block data and, therefore, the processing moves on to S609.

When the update flag has been set to "0" for any of one or more of the blocks among all the blocks of size SB from the recovery target address (S603:NO), drive copy is started as mentioned in FIG. 12 above.

The controller 30 confirms the status of the recovery source drive (S604) and, when the status of the recovery source drive is "drive copy in progress" (S605), data of size SB from the recovery source drive is read and stored in the cache memory 130 (S606).

The controller 30 writes data that has been stored in the cache memory 130 to the recovery destination drive (S607) and updates the bitmap T15 (S608). Further, the controller 30 increases the recovery target address by SB (S609) and judges whether all the data of the recovery source drive has been copied (S610). The steps S604 to S610 are repeated until all the data of the recovery source drive are copied to the recovery destination drive.

When it is judged in S605 that the status of the recovery source drive is "correction copy in progress", the processing moves on to FIG. 25. The controller 30 judges whether another correction copy is being performed in the same RAID group 212 as the recovery source drive (S611). The other correction copy is called the second correction copy and the recovery destination drive used in the second correction copy is called the second recovery destination drive.

When a second correction copy is being performed (S611: YES), the controller 30 reads data and parity from each of the other disk drives 210 and stores the data and parity in the cache memory 130 (S612). The controller 30 judges whether the copy processing of the first recovery destination drive is more advanced than the copy processing of the second recovery destination drive (S613).

When the correction copy of the first recovery destination drive is more advanced than the correction copy of the second recovery destination drive (S613:YES), the controller 30 restores the data to be processed on the basis of the data and parity stored in the cache memory 130 (S614). Further, the controller 30 writes the restored data to both of the first and second recovery destination drives (S615) and updates the respective bitmap T15 for each recovery destination drive (S616). The bitmap T15 is prepared for each of the disk drives.

The controller 30 write data to both the recovery destination drives before moving on to S609 in FIG. 24 and increasing the recovery target address by SB.

When it is judged in S613 that the correction copy of the first recovery destination drive is not more advanced than the correction copy of the second recovery destination drive (S613:NO), the controller 30 restores the data to be processed on the basis of the data and parity stored in the cache memory 130 (S617). Further, the controller 30 writes the restored data to only the first recovery destination drive (S618) and updates the first recovery destination drive's bitmap T15 (S619).

When a second correction copy has not been started in the same RAID group 212 (S611:NO), the controller 30 reads the data and parity from each of the other disk drives 210, stores the data and parity in the cache memory 130 (S620), and restores the data (S621) as illustrated by FIG. 12.

This embodiment, which is constituted thus, affords the same operating effects as each of the embodiments. In addition, in this embodiment, the constitution is such that, when a plurality of correction copies are started within the same RAID group 212, data restored by means of the correction copy whose processing is more advanced is written to a plurality of recovery destination drives. Therefore, the correction copy can be performed efficiently by preventing duplicate data restoration processing from being performed.

Fifth Embodiment

Figure 26:
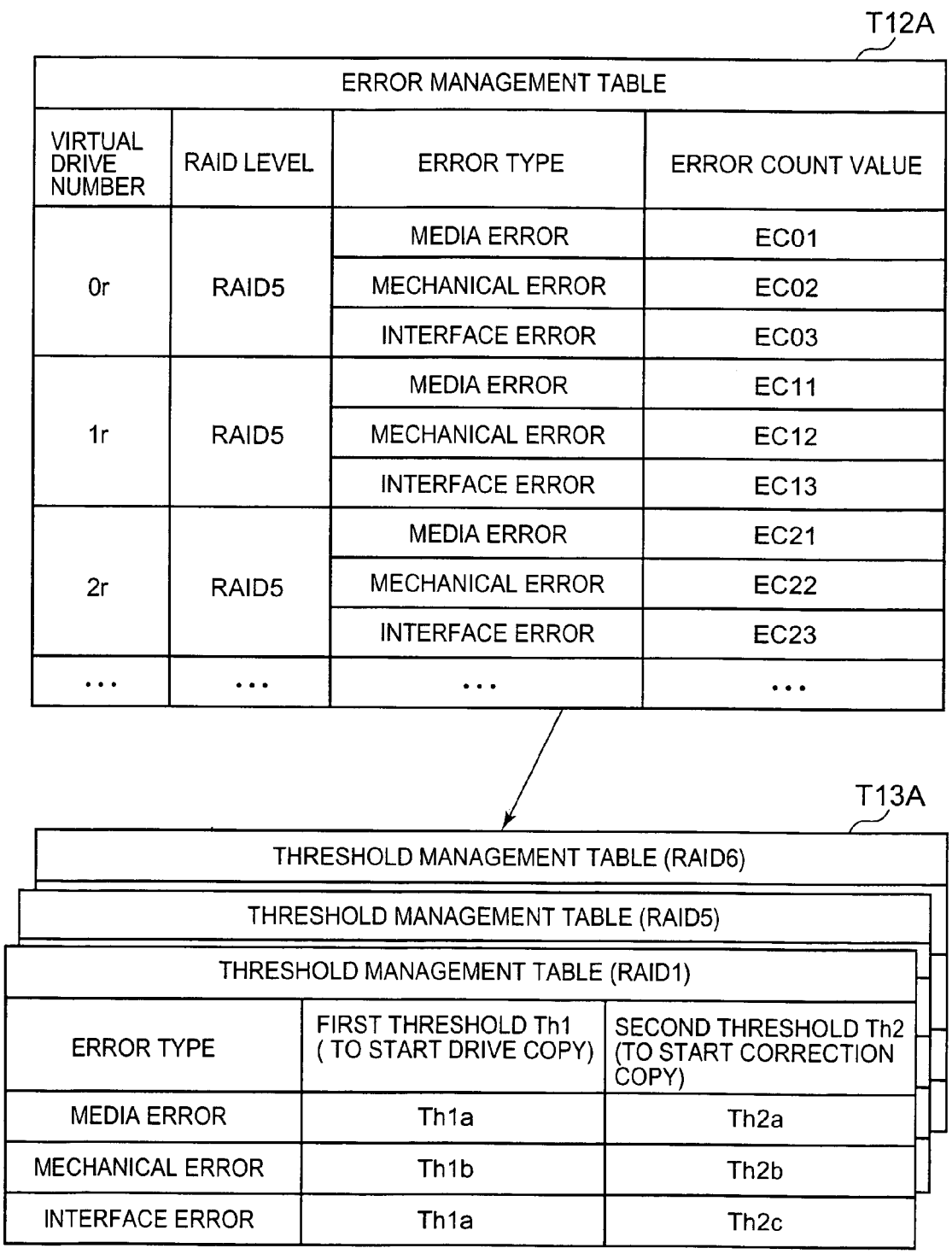
FIG. 26 is an explanatory diagram showing the constitution of an error management table and a threshold management table that are used by a storage control device according to a fifth embodiment.

A fifth embodiment will now be described on the basis of FIGS. 26 and 27. This embodiment describes a plurality of modified examples relating to an error management method. As shown in FIG. 26, the 'RAID level' may be added to the management item of an error management table T12A. Further, a threshold management table T13A can be prepared for each RAID level.

As a result, because different thresholds Th1 and Th2 can be established for each RAID level, error monitoring and drive recovery suited to the RAID type can be performed.

As shown in FIG. 27, the 'drive type' can also be added to the management item of an error management table T12B. The threshold management table T13B is prepared for each drive type. The drive type is information indicating the type of disk drive 210 and such types include, for example, an FC disk, an ATA disk, and so forth.

As a result, different thresholds Th1 and Th2 can be established for each drive type and error monitoring and drive recovery suited to the drive type are possible.

This embodiment, which is constituted thus, affords the same operating effects as each of the above embodiments. In addition, in this embodiment, because the thresholds Th1 and Th2 can be established in accordance with the RAID level and drive type and so forth, suitable error monitoring and drive recovery can be performed in accordance with the reliability attributable to the RAID level and drive type and so forth. For example, by setting the threshold low for disk drives and RAID groups of low reliability, the signs of a fault can be detected quickly and a drive copy, which constitutes a preventative measure, can be executed.

Moreover, the present invention is not limited to or by the above embodiments. A person skilled in the art is able to make a variety of additions and modifications and so forth within the scope of the present invention.

What is claimed is:

1. A storage control device comprising a plurality of storage devices including at least one spare storage device, comprising:
   an error condition detection section that detects the error condition of each of the storage devices;
   an input/output request control section that, when an error is detected by the error condition detection section, controls the input/output request from a host computer with respect to the storage device in which the error has been detected; and
   a recovery control section that, when the error condition detected by the error condition detection section exceeds a preset threshold, recovers the stored content of a recovery-target storage device, in which the error has been detected, in the spare storage device,
   wherein the recovery control section comprises:
   a first copy mode that reads data from the recovery-target storage device and copies the data thus read to the spare storage device; and
   a second copy mode that restores data stored in the recovery-target storage device on the basis of data read from other storage devices belonging to the same RAID group as the recovery-target storage device and copies the restored data to the spare storage device, and wherein
   when shifting from the first copy mode to the second copy mode, the recovery control section starts the second copy mode from the copy interrupt position of the first copy mode.

2. The storage control device according to claim 1, wherein the recovery control section recovers the stored content of the recovery-target storage device by executing the first copy mode when the error condition detected by the error condition detection section is equal to or more than a first threshold and less than a second threshold, and
   recovers the stored content of the recovery-target storage device continuously by shifting from the first copy mode to the second copy mode when the error condition detected by the error condition detection section is equal to or more than the second threshold.

3. The storage control device according to claim 1, wherein, when shifting from the first copy mode to the second copy mode, the recovery control section secures the spare storage device used by the first copy mode and starts the second copy mode by using the secured spare storage device.

4. The storage control device according to claim 1, wherein the recovery control section executes the first copy mode and the second copy mode serially as one process.

5. The storage control device according to claim 1, wherein, when the error condition detected by the error condition detection section is equal to or more than a first threshold and less than a second threshold, a first status for selecting the first copy mode is set for the recovery-target storage device, and, when the error condition detected by the error condition detection section is equal to or more than the second threshold, a second status for selecting the second copy mode is set for the recovery-target storage device, and
   the recovery control section:

copies data in predetermined amounts at a time from the recovery-target storage device to the spare storage device by starting the first copy mode when the first status has been set for the recovery-target storage device;

updates copy position management information for managing the copy completion position each time a data copy of the predetermined amount is completed;

confirms the status of the recovery-target storage device each time the copy position management information is updated; and shifts from the first copy mode to the second copy mode by using the copy position management information continuously when the status of the recovery-target storage device is changed from the first status to the second status.

6. The storage control device according to claim 1, wherein the input/output request control section stores and manages, as update management information, the condition of the update to the spare storage device by the host computer; and the recovery control section executes the first copy mode or the second copy mode with respect to a storage area other than the updated storage area.

7. The storage control device according to claim 6, wherein the input/output request control section specifies a storage device that is used to process input/output requests from the host computer on the basis of the update management information.

8. The storage control device according to claim 1, wherein, when a plurality of the second copy mode are started within the same RAID group, the recovery control section stores data that has been recovered by means of a second copy mode whose processing precedes other processing to a spare storage device of the preceding second copy mode and a spare storage device of a second copy mode whose processing is delayed respectively.

9. A method for recovering data stored in a storage control device comprising a RAID group constituted by a plurality of storage devices, the method comprising the steps of:

detecting an error condition relating to each storage device in the RAID group;

setting a first status for selecting a first copy mode for a recovery-target storage device in which an error has been detected when the detected error condition is equal to or more than a first threshold and less than a second threshold;

setting a second status for selecting a second copy mode for the recovery-target storage device when the detected error condition is equal to or more than the second threshold;

copying data in predetermined amounts at a time from the recovery-target storage device to the spare storage device by starting the first copy mode when the first status is set for the recovery-target storage device;

updating copy position management information for managing a copy completion position each time a data copy of the predetermined amount is completed;

confirming the status of the recovery-target storage device each time the copy position management information is updated;

shifting from the first copy mode to the second copy mode by using the copy position management information continuously when the status of the recovery-target storage device is changed from the first status to the second status, and restoring data that has been stored in the recovery-target storage device on the basis of data that is read from the other storage devices belonging to the same RAID group as the recovery-target storage device; and copying the restored data to the spare storage device.

* * * * *